(12) United States Patent
Nelson et al.

(10) Patent No.: US 9,147,313 B2
(45) Date of Patent: Sep. 29, 2015

(54) DYNAMICALLY CONFIGURING ELECTRONIC GAMING MACHINES BASED ON PLAYER MOBILE DEVICE ACTIVITY

(71) Applicant: IGT, Reno, NV (US)

(72) Inventors: Dwayne R. Nelson, Las Vegas, NV (US); Dennis T. Kleppen, Henderson, NV (US); David M. Oles, Henderson, NV (US)

(73) Assignee: IGT, Reno, NV (US)

( * ) Notice: Subject to any disclaimer, the term of this patent is extended or adjusted under 35 U.S.C. 154(b) by 157 days.

(21) Appl. No.: 13/910,942

(22) Filed: Jun. 5, 2013

(65) Prior Publication Data

US 2014/0364203 A1 Dec. 11, 2014

(51) Int. Cl.
*A63F 9/24* (2006.01)
*G07F 17/32* (2006.01)

(52) U.S. Cl.
CPC ........ *G07F 17/3227* (2013.01); *G07F 17/3218* (2013.01); *G07F 17/3223* (2013.01); *G07F 17/3225* (2013.01); *G07F 17/3255* (2013.01)

(58) Field of Classification Search
CPC ............ G07F 17/3227; G07F 17/3225; G07F 17/3223; G07F 17/3255; G07F 17/3239; G07F 17/3218
USPC ............................................................ 463/42
See application file for complete search history.

(56) References Cited

U.S. PATENT DOCUMENTS

| | | | |
|---|---|---|---|
| 2009/0221366 A1* | 9/2009 | Ward et al. ...................... | 463/30 |
| 2014/0031127 A1* | 1/2014 | Westerberg ..................... | 463/42 |
| 2014/0051499 A1* | 2/2014 | Hamlin et al. .................. | 463/25 |
| 2014/0200065 A1* | 7/2014 | Anderson et al. ............... | 463/20 |

* cited by examiner

*Primary Examiner* — Steve Rowland
(74) *Attorney, Agent, or Firm* — Griffiths & Seaton PLLC

(57) ABSTRACT

A gaming system samples information from a mobile device that is connected to a gaming network for use by at least one electronic gaming machine (EGM) included in the gaming network.

36 Claims, 16 Drawing Sheets

DYNAMICALLY CONFIGURING ELECTRONIC GAMING MACHINES BASED ON PLAYER MOBILE DEVICE ACTIVITY

COPYRIGHT NOTICE

A portion of the disclosure of this patent document contains or may contain material, which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

1. Field of the Invention

The present invention relates in general to gaming devices and systems, and more particularly to dynamically configuring a gaming device in a gaming system based on player mobile device (PMD) activity.

2. Description of the Related Art

Games of chance have been enjoyed by people for many years and have undergone increased and widespread popularity in recent times. As with most forms of entertainment, some players enjoy playing a single favorite game, while others prefer playing a wide variety of games. In response to the diverse range of player preferences, gaming establishments commonly offer many types of electronic games. Many electronic gaming machines (EGMs), such as slot machines and video poker machines, have been a cornerstone of the gaming industry for several years. The EGMs are computer based and contain multiple external interfaces for connecting with external devices and mobile devices.

SUMMARY OF THE DESCRIBED EMBODIMENTS

A current challenge for gaming institutions, in view of increasingly popular use by players, and an increasing number of electronic gaming machines (EGM) and the like in gaming environments, is advantageously providing the EGMs, especially microprocessor-based gaming machines that store gaming programs for operating and using the EGM, with the flexibility and capabilities of communicating with external devices. As the gaming industry becomes more mobile it is likely that players will be using their various external devices (e.g., mobile devices such as cell phones and the like) in Casinos and other gaming venues. Also, there are many use cases for players, patrons, regulators, and/or operators to use an external application (e.g., a mobile digital device, digital media extender, a smart phone, an electronic tablet, a player mobile device 'PMD', a computer, and the like). As such, a need exists for configuring an electronic gaming machine (EGM) based on the activity of a players' external application.

To address these aforementioned needs, in one embodiment, by way of example only, methods, systems, and computer program products are provided for dynamically configuring a gaming device in a gaming system based on player mobile device (PMD) activity having at least one processor device. A gaming system samples information from a mobile device that is connected to a gaming network for use by at least one electronic gaming machine (EGM) included in the gaming network.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
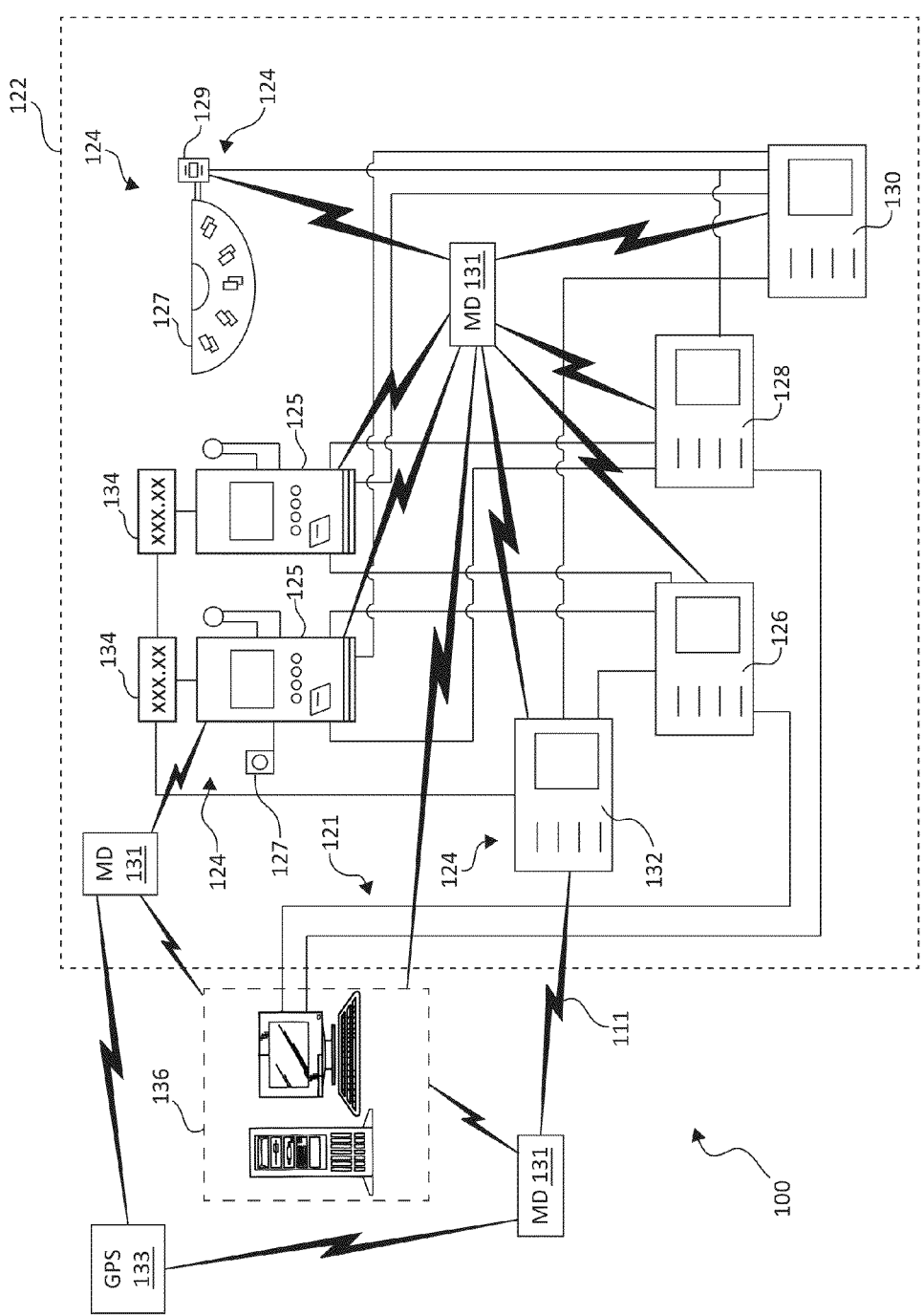
FIG. 1 is a block diagram illustrating a gaming system environment with a gaming terminal data repository (GTDR) connected via one or more network interface(s) to a gaming network which, for example, may include gaming devices (e.g., gaming terminals), in which aspects of the present invention may be realized.

In general, gaming machines require a player to place or make a wager to activate a primary or base game. The award may be based on the player obtaining a winning symbol or symbol combination and on the amount of the wager (e.g., the higher the wager, the higher the award). Symbols or symbol combinations that are less likely to occur usually provide higher awards. In such gaming machines, the amount of the wager made on the base game by the player may vary. For instance, a gaming machine may allow the player to wager a minimum number of credits, such as one credit (e.g., one penny, nickel, dime, quarter or dollar) up to a maximum number of credits, such as five credits. The player may make this wager a single time or multiple times in a single play of a primary game. For instance, a slot game may have one or more pay lines and the slot game may allow the player to make a wager on each pay line in a single play of the primary game. Slot games with 1, 3, 5, 9, 15 and 25 lines may be provided. Thus, a gaming device, such as a slot game, may allow players to make wagers of substantially different amounts on each play of the primary or base game ranging, for example, from one credit up to 125 credits (e.g., five credits on each of 25 separate pay lines). This is also true for other wagering games, such as video draw poker, where players can wager one or more credits on each hand and where multiple hands can be played simultaneously. Different players play at substantially different wagering amounts or levels and at substantially different rates of play.

Secondary or bonus games may also be provided in the gaming machines. The secondary or bonus games may provide an additional award to the player. Secondary or bonus games may not require an additional wager by the player to be activated. Secondary or bonus games may be activated or triggered upon an occurrence of a designated triggering symbol or triggering symbol combination in the primary or base game. For instance, a bonus symbol occurring on the pay line on the third reel of a three-reel slot machine may trigger the secondary bonus game. When a secondary or bonus game is triggered, the gaming machines may indicate this to the player through one or more visual and/or audio output devices, such as the reels, lights, display units, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Progressive awards may also be provided in gaming machines. A progressive award may be an award amount that includes an initial amount funded by a casino and an additional amount funded through a portion of each wager made on the progressive gaming machine. For example, 1% to 5% of each wager placed on the primary game of the gaming machine associated with the progressive award may be allocated to the progressive award or progressive award fund. The progressive award grows in value as more players play the gaming machine, and thus, portions of these players' wagers are allocated to the progressive award. When a player obtains a winning symbol or symbol combination, which results in the progressive award, the accumulated progressive award is provided to the player. After the progressive award is provided to the player, the amount of the next progressive award may be reset to an initial value, a predetermined value, or randomly generated value, and a portion of each subsequent wager on a gaming machine associated with the progressive is allocated to the next progressive award as described above.

A progressive award may be associated with a single gaming machine or multiple gaming machines which each contribute portions of the progressive award. The multiple gaming machines may be in the same bank of machines, in the same casino or gaming establishment (usually through a local area network ("LAN")) or in two or more different casinos or gaming establishments (usually through a wide area network ("WAN")). Such progressive awards are sometimes called local area progressive ("LAP") and wide area progressive ("WAP"), respectively. Progressive awards may increment through communication between a progressive controller and one or more gaming machines. The gaming machines associated with the progressive award transfer coin-in information to a progressive controller. From this information, the progressive controller calculates how much to increment the progressive award based on a set increment rate and then increments the progressive award accordingly. The gaming machines may provide the player a choice between different wager levels prior to the commencement of a primary game. The different wager levels enable the player to win different progressive awards. The gaming devices provide a progressive jackpot where the value of the jackpot may increase by a particular amount for every game played. Thus, when multiple gaming devices are linked together to form one large progressive jackpot, the jackpot grows more quickly because multiple players are contributing to the jackpot at the same time.

In one embodiment, there may be one or more various types of EGM machines, each having a variety of gaming themes, on any casino floor (and/or other gaming venue) using the above described gaming systems. The EGMs may uses the various gaming award systems, jackpots, progressive jackpots, and/or other type of gaming systems and awards. As mentioned above, users of the various gaming devices (e.g., an EGM) have a general interest in, and may expend resources trying to identify, which of these various and preferred EGMs are paying out the largest and most frequent awards and/or progressive jackpots. As such, a need exist for providing in real time, to a user, one or more of the user's favorite and/or preferred EGMs, and/or a list of EGM devices available and/or unavailable in the gaming venue, in order to play one or more of the favorite and/or preferred EGMs (e.g., the EGM labeled as "Wheel of fortune").

As mentioned above, users of these gaming devices have a general interest in using their various external devices (e.g., a personal electronic device (PED), mobile devices such as cell phones, electronic tablets, computers, and the like) in Casinos and other gaming venues. There are many use cases for players, patrons, regulators and operators to use a an external application (e.g., a mobile digital device, digital media extender, a smart phone, an electronic tablet, a player mobile device 'PMD', a computer, and the like) to communicate with EGMs. Thus, in one embodiment, the present invention provides a solution for configuring an electronic gaming machine (EGM) based on the activity of a players' external application. In one embodiment, the present invention virtually connects an external application e.g., a mobile digital device, digital media extender, a smart phone, an electronic tablet, a player mobile device 'PMD', a computer, and the like, which hereinafter may be collectively referred to as the player mobile device 'PMD' and/or mobile device), to an EGM without the mobile device directly connecting to the EGM. In one embodiment, the mobile device network activity is used to customize the EGM experience. For example a player visiting a gaming Internet website (e.g., PokerStars.com) on the players' mobile device could be presented with one or more poker games on the EGM related to the visited gaming Internet website(s). Another example would be to detect the language in which the player is using the web and configure the EGM to match that language.

In one embodiment, by way of example only, a gaming system samples information from a mobile device that is connected to a gaming network for use by at least one electronic gaming machine (EGM) included in the gaming network. In one embodiment, the present invention configures at least one EGM according to the sampled information. The sampled information includes at least data, historical data, electronic messages, social media data, data relating to global positioning satellite "GPS" of the mobile phone (e.g., the identity of various locations where the mobile device has been tracked, used, and/or visited is collected and analyzed and part of the sampled information), data stored on a memory device, email data, behavior characteristics and use patterns of the user of the external application (e.g., mobile device, graphical theme of the EGM, gaming activities, internet activity, responses, social media data, stored mobile device data, player account data, and information used by the EGM. In one embodiment, the present invention configures at least one EGM according to one of a variety of predetermined player preferences, the gaming volume of the EGM, the EGM gaming speed, bonus events, multimedia events, historical usage of the mobile device on the EGMs, player account information provided to the gaming network from the mobile device, one or more gaming applications available on the EGMs, and/or a variety of services and non-gaming applications offered by the EGMs, etc. Also, as part of the configuration process, the configuration of the EGMs may include customizing the EGM and/or the mobile device and/or both the EGM and the mobile device to match each other. For example, in one embodiment, the sampled information obtained from the mobile device is used to customize the EGM to match the sampled information on the mobile device. In one embodiment, the present invention allows for similarly customizing the external application based on the configuring and customizing of the EGM.

Also, as part of the customization, in one embodiment, a menu, display information, a service window on the EGM, a pay tables and denominations on the EGM, gaming activity, EGM applications, and/or a style of gaming activity on EGM to match a gaming style on the mobile device may all be customized. In one embodiment, the display information includes a variety of languages. For example, the sampled information may reveal that the external application is using the Chinese language, which would trigger the EGM to dynamically customize the EGM to display the Chinese language for the user. In one embodiment, a notification may be provided on either the EGM and/or the mobile device to accept and/or reject any configuration and/or customization as described herein.

In one embodiment, the present invention monitors the mobile device via a host of the gaming network and samples the information from the mobile device in real time. The host may also be used in the gaming network for acting as a proxy for communicating between the mobile device and the at least one EGM. In one embodiment, each one of the EGMs is monitored using a monitoring system remotely located in the gaming network. Data is harvested from each one of the EGMs and also from the mobile device using the monitoring system. In one embodiment, the data includes at least statistical information, historical use information associated with the mobile device and/or each one of the EGM' and the user, accounting information, wagering data, and gaming and members profile information associated with the user, predetermined preferences for indicating a users favorite and/or preferred game/EGM, and various information and data acquired via a player tracking system. In one embodiment, the collected data may be stored in one of a variety storage locations, such as a remote storage system that is in communication with each EGM. The data may be collected, harvested, updated, stored, and/or accessed in real time. In one embodiment, at least a portion of the data and geolocation data that is associated with the mobile device and/or each one of the EGMs is published to and/or displayed in the information window and/or external application. The information window may be updated in real time with the harvested data from each one of the EGMs. This data may be uploaded in real time from a software add on product from the casino floor to a cellular network, a wireless RLAN (Radio Local Area Network) standard, commercially known as WIFI®, Wi-Fi or WIFI or other type of communication channel for display via the external application and/or the EGMs.

In one embodiment, the present invention detects the mobile device is actively browsing the gaming network and/or actively browsing a non-gaming network and at least one website during a gaming activity. In one embodiment, the present invention notifies the mobile device upon an occurrence of a gaming event during the gaming activity, and/or determines a users interest level for the at least one of the EGM based on the sampled information.

In one embodiment, a gaming venue may be defined; including defining a number of the EGMs from data that is harvested and/or collected by a controller (e.g., a master gaming controller) and/or a monitoring system. The gaming venue may be defined as one or more casinos, one or more floors of the one or more casinos, a defined and/or restricted section of the one or more casinos, one or more of a specified gaming device (e.g., all video poker gaming devices), one or more of any combination of gaming devices, one or more gaming devices based on the manufacturer or owner, and/or single or multiple venues (e.g., a restaurant and/or a chain of convenience restaurants, a business and/or a chain of businesses, a convenience store and/or a chain of convenience stores, a hotel and/or a chain of hotels, an organization, and/or combination of any type of business, entity, and/or organization providing gaming entertainment, etc.). The venue may be defined at a local, regional, state, country, and/or international level. For example, a casino operator having multiple casinos throughout the world may define the gaming venue to be all casinos throughout the world, having a particular gaming device, to be the gaming venue for purposes of progressive value tracking. In another embodiment, by way of example only, a casino may define the gaming venue to be all gaming devices located on a specified floor (e.g., $1^{st}$ floor of the casino). In still an alternative embodiment, casinos owned and operated by different entities, having a business relationship, may define the gaming devices to only those gaming devices within the casinos of the business relationship. As one of ordinary skill in the art will appreciate, the applicable venue in which EGMs are used may vary according to business/organizational need, a particular application, or other factors.

In one embodiment, by use of a player tracking system, vendors may provide for an exclusive membership club for users of the service window application and/or external application relating to one of the EGMs (e.g., membership club of the favourite and/or preferred EGM). A swipe card may be provided with the external application (e.g., mobile application, web application, and the like) to be used with the gaming device. In one embodiment, the external application provides for a variety of options for online betting to casino tables, games, and sports books, and or other types of online gaming services.

Turning now to FIG. 1, a block diagram illustrating a gaming system environment 100 is shown. Environment 100 includes a Gaming Terminal Data Repository (GTDR) connected via one or more network interface(s) to a gaming network which, for example, may include gaming devices (e.g., gaming terminals) and/or other devices, in which aspects of the present invention may be realized. As illustrated in FIG. 1, the gaming environment 100 may comprise a gaming system/environment 122 located in a physical environment (not shown). It will be appreciated that the communications links between the various components may be separate and distinct or may be commonly used. It will also be appreciated that one or more of the functions or applications described above may be consolidated, such as at a common server or host. Further, other components for implementing other functionality may be provided. For example, a variety of computing devices, such as user stations, may be connected to the various systems. Printers and other peripheral devices may also be connected to each network or system. A gaming system/environment 122 may be located at least partially in one or more physical gaming environments, such as a casino, restaurant, and/or convenience store. For example, the casino may include publicly accessible game areas where certain of the gaming system devices 124, such as gaming machines 125 and table games 127 are located, as well as secure areas where the servers and other components are located.

In one embodiment, the physical environment includes at least a portion of a physical structure, such as casino, housing one or more components of the gaming system/environment 122. The gaming system/environment 122 includes one or more gaming system devices 124 or components. The gaming system devices 124 may include gaming machines 125, such as those known as video or slot machines. The devices 124 may also include "table" games 127 such as Blackjack and Roulette. The gaming devices 124 may also include components or devices such as player tracking card readers 129, coin counters and other gaming devices functionality options, which devices or components may be linked or associated with other devices. The devices or components may also comprise computers or servers and communication equipment, cashier and accounting workstations and a wide variety of other elements.

In one embodiment, the gaming system/environment 122 may include a variety of sub-systems. These sub-systems may be partially or fully independent of one another or may be related. In one embodiment, each system may be included or be part of a network. In one embodiment, the gaming system/environment 122 may include a game presentation/operation system, which includes at least one game server 126. The game server 126 may comprise a computing device including a processor and a memory. The game server 126 may be adapted to perform a variety of functions. This functionality may be implemented by software and/or hardware of the server 126. In one embodiment, the game server 126 may be arranged to provide information or instructions to the one or more gaming devices 124 or individual gaming system components. The information may comprise game code and control data. In one embodiment, the game server 126 may also be arranged to accept information from the gaming devices 124 or components. For example, the game sever 126 may accept information regarding the status of operation of a particular gaming system device 124 (such as "normal" or "malfunction").

In one embodiment, the game server 126 is part of a network, which includes a communication link between the game server 126 and selected gaming system device(s) 124 and/or other component(s) with which communication is desired. A communication interface may be associated with the game server 126 and each device or component for facilitating the communication. The communication interfaces may have a variety of architectures and utilize a variety of protocols such as IEEE-1394 (FireWire™) or Ethernet in the case where the communication link is a wired link, or a wireless link utilizing a wireless protocol such as WIFI, Bluetooth™, Radio Frequency (RF), Infrared, etc. The communication links may transmit electrical, electromagnetic or optical signals, which carry digital data streams, or analog signals representing various types of information. In one embodiment, such as when the gaming device 124 comprises a gaming machine 125, the device 124 may include a master gaming controller, which controls the functions of game operation. The communication interface may be associated with the master gaming controller, permitting data to be transmitted between the game server 126 and the master gaming controller.

In one embodiment, the gaming system/environment 122 may include a player tracking system, which includes at least one player-tracking server 128. The player-tracking server 128 may also comprise a computing device including a processor and a memory. The player-tracking server 128 may be adapted to perform player-tracking functions. For example, the player-tracking server 128 may store information regarding the identities of players and information regarding the game play of those players. This information may include time of play, coin in/coin out or other monetary transaction data, and in an arrangement where players are awarded points based on play, a player's point total. Once again, the player tracking system includes a network comprising a communication link provided between the player tracking server 128 and one or more of the gaming devices 124 having a player tracking function or other components of the gaming system/environment 122 associated with the system. In one embodiment, such as where the gaming device 124 comprises a gaming machine, the device may include a management interface board, which controls a card reader. The management interface board may be arranged to receive data from the master gaming controller of the gaming system device 124. A communication interface is associated with the management interface board, permitting data to be transmitted between the player tracking server 128 and the management interface board.

In the case of table games, a card reader 129 may be associated with the table (e.g., the card reader located on or near the table game). Players may utilize the card reader to identify themselves. Information regarding play of the table game may be input through an input device by a dealer, coin counter or the like, and this information may be transmitted to the player tracking server 128.

In one embodiment, the gaming system/environment 122 may include an accounting system, which includes at least one accounting server 130. The accounting server 130 may comprise a computing device including a processor and a memory. The accounting server 130 is preferably adapted to perform financial related functions, such as track financial transactions such as bets and payouts, and perform reconciliations with monies collected from the gaming system devices 124, such as gaming machines 125, tables games 127. The accounting server 30 may be associated with a wide variety of devices, including individual gaming system devices 124 and other servers. Once again, a communication link may be provided between the accounting server 130 and each device with which communications is desired.

In one embodiment, the gaming system/environment 122 may include a progressive award system, which includes at least one progressive server 132. The progressive sever 132 may comprise a computing device including a processor and a memory. The progressive server 132 may be designed to generate progressive award information. In one arrangement, the progressive server 132 may obtain information regarding amounts bet at specific gaming system devices 124, such as gaming machines 125 or table games 127. Utilizing this information, a progressive jackpot award amount may be generated and updated using a specified protocol. The information may be transmitted to one or more displays 134 associated with participating devices 124. Once again, a communication link is preferably provided between the progressive server 132 and each device with which communications is desired. For example, a link may be provided between the progressive server 132 and accounting server 130 for providing payout information to the accounting server 130. The accounting server 130 also reads the paid amounts from the electronic gaming machines 125 as well and makes sure the paid amounts match what the progressive server claimed the paid amounts should have been. If the paid amounts don't match, then the accounting server 130 may raise a flag for further investigation by casino staff or regulators.

A physical and/or virtual information host 136 is associated with or comprises a portion of the gaming system/environment 122. In one embodiment, the host 136 comprises a computing device, which includes a processor, memory and a display. The virtual information host 136 may be one or more devices separate from devices performing other functions of the system/environment 122, or may be integrated with existing devices. The virtual information host 136 may be designed and adapted to perform functions relating to acquiring, managing, rendering, generating and/or displaying real-time and/or non real-time casino gaming system or "gaming environment" graphical information and information regarding one or more components of the gaming system or environment. Such functionality may also include the generation of at least one graphical user interface on at least one mobile device (e.g., 131), which is configured or designed to graphically display information (e.g., real-time casino information) relating to selected aspects of casino activity. Also, different graphical user interfaces may be displayed on an external application, such as on an application of a computer, smart phone, and/or on any type of mobile device 131. In one embodiment, bi-directional communication channels 121 are provided for direct, two-way communication between the host 136 and at least one game server 126 and at least one player-tracking server 128, and/or any other device with which communications is desired.

As illustrated in the example of FIG. 1, gaming system/environment 122 may also include one or more mobile devices 131 configured or designed to communicate, via one or more wireless links 111, with various components of the gaming environment 100 such as, for example: information systems (e.g., virtual information host 136); player tracking systems; accounting systems; employee management systems; location positioning systems (e.g., GPS system 133); game servers; surveillance systems; security systems; communications systems; gaming systems (e.g., gaming machines 125, game table devices 127, other mobile devices 125, etc.); etc.

Figure 2:
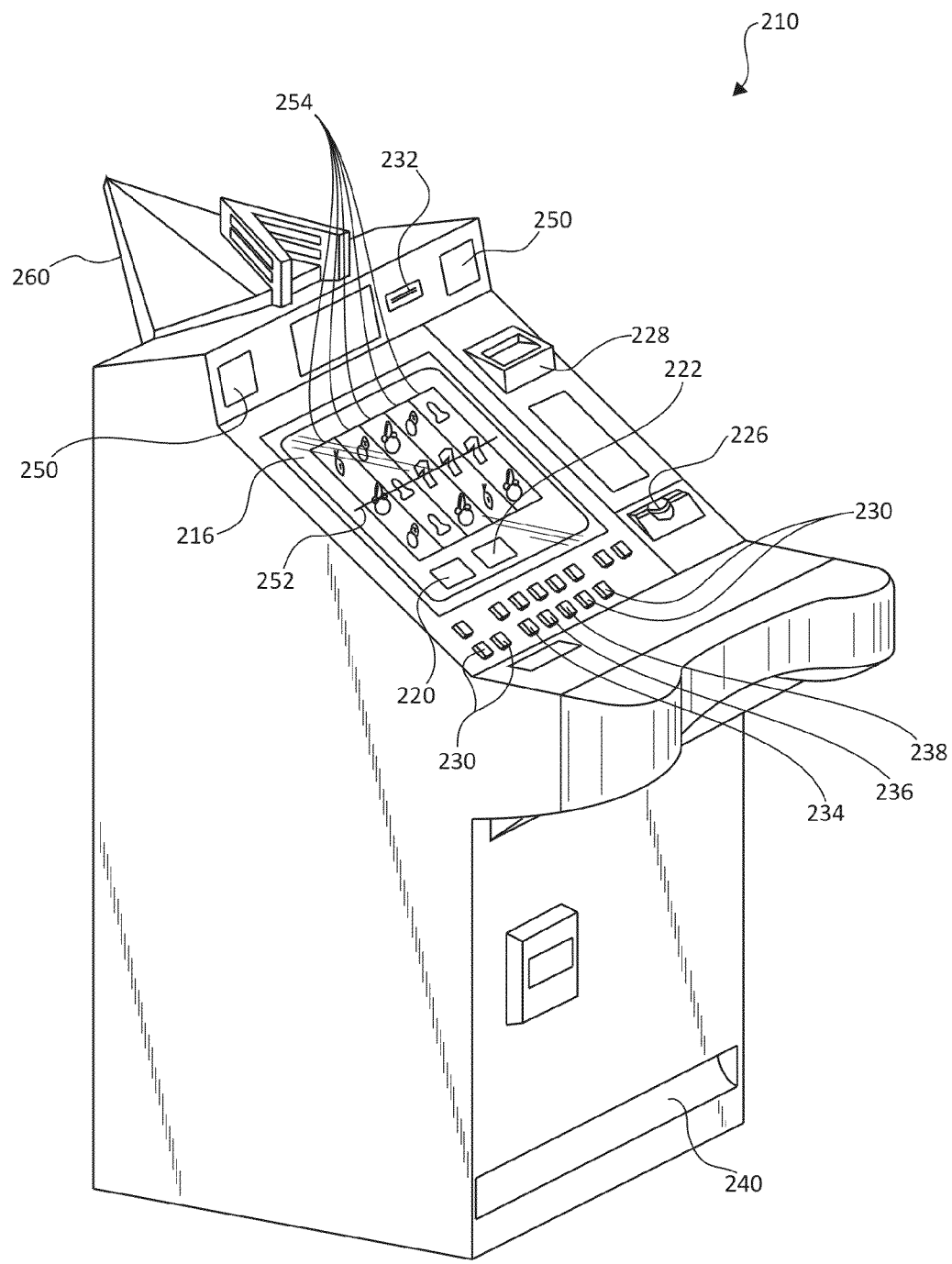
FIG. 2 is a perspective view of one embodiment of a slot machine or gaming device suitable for use in the gaming system of FIG. 1, in which aspects of the present invention may be realized.

FIG. 2 is a perspective view of one embodiment 210 of a slot machine, EGM, or gaming device suitable for use in the previously depicted system of FIG. 1, in which aspects of the present invention may be realized. FIG. 2 represents a base gaming device 210 that can be employed in the shared display system or the gaming system of the present invention is illustrated as gaming device 210. FIG. 2 illustrates features common to each of the gaming devices. In one embodiment, gaming device 210 has a support structure, housing or cabinet, which provides support for a plurality of displays, inputs, controls and other features of a conventional gaming machine. In the illustrated embodiment, the player plays gaming device 210 while sitting, however, the gaming device is alternatively configured so that a player can operate it while standing or sitting. The illustrated gaming device 210 is positioned on the floor but can be positioned alternatively (i) on a base or stand, (ii) as a pub-style table-top game (e.g., where the participant gaming devices are located remotely from the shared wheel as discussed below), (iii) as a stand-alone gaming device on the floor of a casino with other stand-alone gaming devices, which the player operates while standing or sitting (e.g., where the participant gaming devices are located remotely from the shared wheel as discussed below), or (iv) in any other suitable manner. The gaming device 210 can be constructed with varying cabinet and display configurations. Also, referring to an embodiment for the electronic configuration of gaming device 210, each gaming device may include the components described below in FIG. 3A and FIG. 3B.

In one embodiment, each gaming device 210 randomly generates awards and/or other game outcomes based on probability data. That is, each award or other game outcome is associated with a probability and each gaming device generates the award or other game outcome to be provided to the player based on the associated probabilities. Since each gaming device 210 generates outcomes randomly or based upon a probability calculation, there is no certainty that the gaming device 210 will provide the player with any specific award or other game outcome.

In another embodiment, as discussed in more detail below, each gaming device 210 employs a predetermined or finite set or pool of awards, progressive awards, prizes or other game outcomes. As each award or other game outcome is provided to the player, the gaming device 210 removes the provided award or other game outcome from the predetermined set or pool. Once removed from the set or pool, the specific provided award or other game outcome cannot be provided to the player again. The gaming device 210 provides players with all of the available awards or other game outcomes over the course of the play cycle and guarantees a designated amount of actual wins and losses.

Figure 3A:
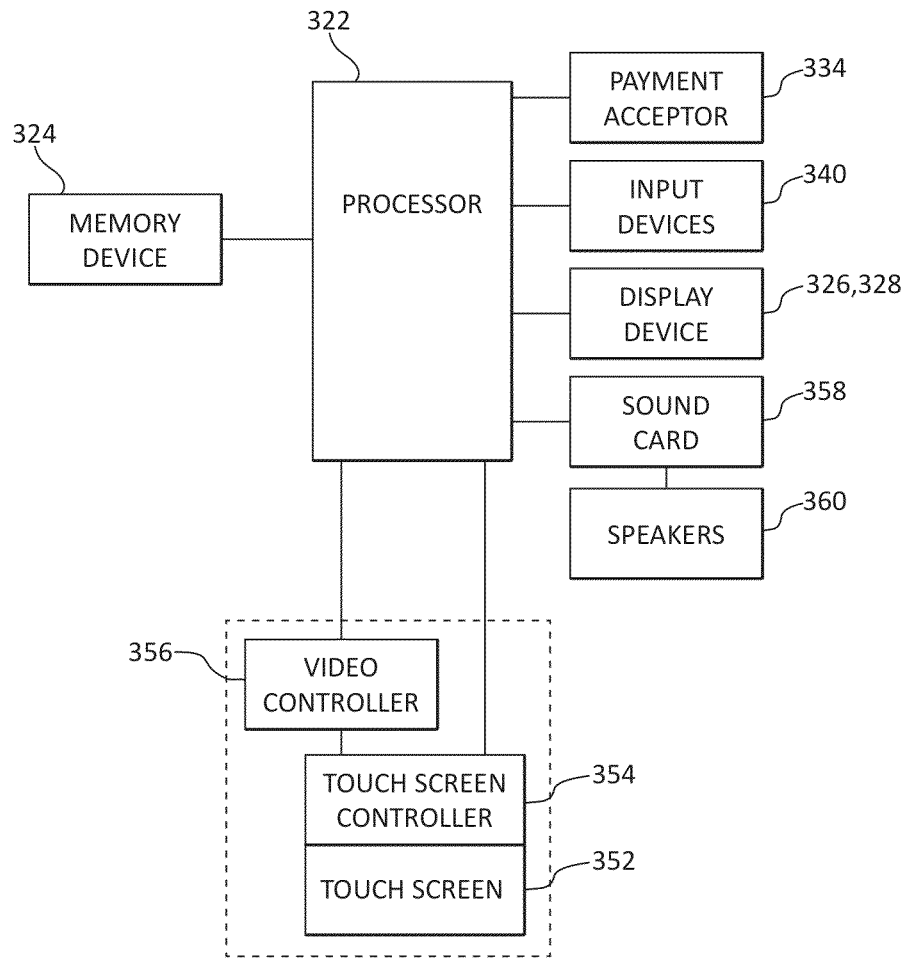
FIG. 3A is a block diagram illustrating an electronic configuration for use in the gaming device of FIG. 2, in which aspects of the present invention may be realized.

As seen in FIG. 2, the gaming device 210 includes a credit display 220 that displays a player's current number of credits, cash, account balance or the equivalent. In one embodiment, gaming device 210 includes a bet display 222 that displays a player's amount wagered. As illustrated in FIG. 3A, in one embodiment, each gaming device 210 includes at least one payment acceptor 334 (FIG. 3A) that communicates with processor 322 (FIG. 3A).

As seen in FIG. 2, the payment acceptor 334 (FIG. 3A) in one embodiment includes a coin slot 226, where the player inserts coins or tokens, and a ticket, note or bill acceptor 228, where the player inserts a bar-coded ticket, note, or cash. In one embodiment, a player-tracking card, credit card, debit card or data card reader/validator 232 is also provided for accepting any of those or other types of cards.

In one embodiment, a player inserts an identification card into card reader 232 of gaming device 210. The identification card can be a smart card having a programmed microchip or a magnetic strip coded with a player's identification, credit totals and other relevant information. In one embodiment, money may be transferred to gaming device 10 through an electronic fund transfer and card reader 232 using the player's credit, debit or smart card. When a player funds gaming device 210, processor 322 (FIG. 3A) determines the amount of funds entered and the corresponding amount is shown on the credit or other suitable display as described above. In one embodiment, after appropriate funding of gaming device 210, the player presses a play button 234 or pull arm (not illustrated) to start any primary game or sequence of events. In one embodiment, upon appropriate funding, gaming device 210 begins game play automatically. In another embodiment, the player needs to actuate or activate one of the play buttons to initiate play of gaming device 210.

As shown in FIG. 2, a bet one button 236 is provided. The player places a bet by pushing bet one button 236. The player increases the player's wager by one credit each time the player pushes bet one button 236. When the player pushes the bet one button 236, the number of credits shown in the credit display 220 decreases by one, and the number of credits shown in the bet display 222 increases by one. A max bet max button (not shown) can also be provided, which enables the player to bet the maximum wager (e.g., max lines and max wager per line). Gaming device 210 may include other suitable wager buttons 230, such as a max bet button, a repeat bet button, one or more select paylines buttons and one or more select wager per payline buttons.

In one embodiment, a cash out button 238 is provided. The player presses cash out button 238 and cashes out to receive a cash payment or other suitable form of payment corresponding to the number of remaining credits. The player can receive coins or tokens in a coin payout tray 240 or a ticket or credit slip, which are redeemable by a cashier or funded to the player's electronically recordable identification card. Each gaming device 210 also includes one or a plurality of communication ports for enabling communication of a processor with one or more external peripherals, such as external video sources, expansion buses, expansion games or other displays, an SCSI port or a key pad.

In one embodiment of FIG. 2, in combination with in FIG. 3A, a touch-screen 352 (FIG. 3A) is provided in one embodiment and operates with a touch-screen controller 354, processor 322 (FIG. 3A) and display device 326,328 (FIG. 3A). Touch-screen 352 (FIG. 3A) and the touch-screen controller 354 are also connected to a video controller 356. The player touches touch-screen 352 at appropriate places to input decisions and signals into processor 322 of gaming device 210. Also, each gaming device 210 may include a sound generating device controlled by one or more sounds cards 258, which function in conjunction with processor 322 (FIG. 3A). In one embodiment, the sound generating device includes at least one speaker 250 or other sound generating hardware and/or software for generating sounds, such as playing music for the primary and/or secondary game or for other modes of the gaming device, such as an attract mode. In one embodiment, each gaming device 210 provides dynamic sounds coupled with attractive multimedia images displayed on display device 216 to provide an audio-visual representation or to otherwise display full-motion video with sound to attract players to gaming device 210. During idle periods, the gaming device 210 displays a sequence of audio and/or visual attraction messages to attract potential players to gaming device 210. The videos in one embodiment are customized to provide information concerning the shared display of the present invention as discussed below.

In one embodiment, gaming device 210 includes a camera in communication with a processor, which is positioned to acquire an image of a player playing gaming device 10 and/or the surrounding area of gaming device 10. In one embodiment, the camera may be configured to selectively acquire still or moving (e.g., video) images and may be configured to acquire the images in either an analog, digital or other suitable format. Display device 216 may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

In one embodiment, as illustrated in FIG. 2, a base or primary game includes a slot game with one or more paylines 252. Paylines 252 may be horizontal, vertical, circular, diagonal, angled or any combination thereof. For a slot game, gaming device 210 displays at least one reel and preferably a plurality of reels 254, such as three to five reels, in either electromechanical form with mechanical rotating reels or in video form with simulated reels and movement thereof. Each reel 254 displays a plurality of indicia such as bells, hearts, fruits, numbers, letters, bars or other images, which preferably correspond to a theme associated with the gaming device. With a slot game, gaming device 10 awards prizes when reels 254 stop spinning and display a winning or paying symbol or combination of symbols on an active payline 252.

In one embodiment, each gaming device 210 includes indicators 260. Indicators 260 reside on the top of each gaming device 10 and point to or indicate one of the awards or outcomes on top of shared display (not shown) when the shared display stops spinning to reveal randomly or otherwise generated results or outcomes. Indicators 260 may illuminate differently at different times or states for the gaming device 210. The illumination of the indicator 260 in one embodiment depends upon whether the gaming device 210 is playing a base game, is in a state in which the player is eligible to play the shared display bonus, is in a state in which the player has committed to play the shared display bonus or is in a state in which the player has declined to play a particular upcoming shared display bonus, as well as other states discussed below.

FIG. 3A is a block diagram illustrating an electronic configuration for use in the gaming device of FIG. 2, here again in which aspects of the present invention may be realized. In the embodiment illustrated in FIG. 3A the player station may include at least one processor 322, such as a microprocessor, a microcontroller-based platform, a suitable integrated circuit or one or more ASICs. The processor 322 is in communication with or operable to access or to exchange signals with at least one data storage or memory device 324. In one embodiment, the processor 322 and the memory device 324 reside within the cabinet of the player station. The memory device 324 stores program code and instructions, executable by the processor 322, to control the player station. The memory device 324 also stores other data such as image data, event data, player input data, random or pseudo-random number generators, pay-table data or information and applicable game rules that relate to the play of the player station. In one embodiment, the memory device 324 includes random access memory (RAM), which can include non-volatile RAM (NVRAM), magnetic RAM (MRAM), ferroelectric RAM (FeRAM) and other forms as commonly understood in the gaming industry. In one embodiment, the memory device 324 includes read only memory (ROM). In one embodiment, the memory device 324 includes flash memory and/or EEPROM. Any other suitable magnetic, optical and/or semiconductor memory may operate in conjunction with the player station and gaming system disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming system is operable over a wireless network, such as part of a wireless gaming system. In this embodiment, the player station may be a hand held device, a mobile device or any other suitable wireless device that enables a player to play any suitable game at a variety of different locations. It should be appreciated that a player station as disclosed herein may be a device (e.g., EGM) that has obtained approval from a regulatory gaming commission or a device that has not obtained approval from a regulatory gaming commission. It should be appreciated that the processor and memory device may be collectively referred to herein as a "computer" or "controller."

In one embodiment, a background play feature may be available where a player, who may be sitting at the lounge and/or at the bar with friends (at the casino) may be playing a machine from the floor by remote via the external application (e.g., a smart phone). The player may substitute into the same game he wanted from an IGT online game and play, or backend the actual game though a venue network. The game may be bankrolled by the venue the player was inside. If the player was to win the player could collect from that venue where the player was located, and/or instead of "reserving" a machine he could continue the game with an auto play during a period of time the player took a break/recess. In one embodiment, a team game may be played by a group of players (e.g., a group of 3 or 4 players) and the group of players may watch and/or play the same game on each players individual external device (e.g., a computer and/or smart phone). Similarly, as described above, the team game may be played by a group of players from a remote location (e.g., bar, lounge, casino, home, office, restaurant, etc.). In one embodiment, the team game may be played by a group of players and the group of players may share credit inputs and wins. In one embodiment, the team game may be played by the group of players and the group of players may sell off and/or share double up options and/or credits to others team players of the group.

In one embodiment, as discussed in more detail below, the gaming device randomly generates awards and/or other game outcomes based on probability data. In one such embodiment, this random determination is provided through utilization of a Random Number Generator (RNG), such as a true random number generator, a pseudo random number generator or other suitable randomization process. In one embodiment, each award or other game outcome is associated with a probability and the player station generates the award or other game outcome to be provided to the player based on the associated probabilities. In this embodiment, since the player station generates outcomes randomly or based upon one or more probability calculations, there is no certainty that the player station will ever provide the player with any specific award or other game outcome. In another embodiment, each award or other game outcome is associated with a probability and the central controller or server generates the award or other game outcome to be provided to the player based on the associated probabilities. In one embodiment, each of the player stations includes an RNG and the central server controls the display of the central display. It should be appreciated there may be one or more RNG's per: (a) display segment; (b) central display; (c) player station; (d) number of games; (e) the number of potential games; or (f) any combination of the above. It should also be appreciated that one or more processors may work together and communicate to accomplish any suitable function of the gaming system.

In another embodiment, the gaming system employs a predetermined or finite set or pool of awards or other game outcomes. In this embodiment, as each award or other game outcome is provided to the player, the central controller flags or removes the provided award or other game outcome from the predetermined set or pool. Once flagged or removed from the set or pool, the specific provided award or other game outcome from that specific pool cannot be provided to the player again. This type of gaming system provides players with all of the available awards or other game outcomes over the course of the play cycle and guarantees the amount of actual wins and losses.

In one embodiment, as mentioned above and seen in FIG. 3A, one input device is a touch-screen 352 coupled with a touch-screen controller 354, or some other touch-sensitive display overlay to allow for player interaction with the images on the display. The touch-screen and the touch-screen controller are connected to a video controller 356. A player can make decisions and input signals into the player station by touching the touch-screen at the appropriate places. One such input device is a conventional touch-screen button panel. In another embodiment, a plurality or each of the display segments is a touch-screen 352 coupled with a touch-screen controller 354 or some other touch-sensitive display overlay to allow for player interaction with the images on the display segments. The touch-screens 352 and the touch-screen controllers 354 are connected to a video controller. The player station may further include a plurality of communication ports for enabling communication of the processor with external peripherals, such as external video sources, expansion buses, game or other displays, an SCSI port or a key pad. In one embodiment, at least one payment acceptor 324 that communicates with processor 322 for playing a bet, input devices 340, and display devices 326,328 are provided.

The player stations, the central controller and the display segments may include serial interfaces and/or ethernet (e.g., G2S (game-to-system) protocol uses commodity Ethernet equipment and TCP/IP) to connect to specific subsystems or subnets internal and external to the player stations, central controller and the display segments. The serial devices may have electrical interface requirements that differ from the "standard" EIA serial interfaces provided by general-purpose computers. These interfaces may include EIA, EIA, Fiber Optic Serial, optically coupled serial interfaces, current loop style serial interfaces, etc. In addition, to conserve serial interfaces internally in the player station, serial devices may be connected in a shared, daisy-chain fashion where multiple peripheral devices are connected to a single serial channel.

The serial interfaces and/or ethernet (e.g., G2S (game-to-system) protocol uses commodity Ethernet equipment and TCP/IP) may be used to transmit information using communication protocols that are unique to the gaming industry. For example, SAS is a communication protocol used to transmit information, such as metering information, from a player station to a remote device. Often SAS is used in conjunction with a player tracking system. EGMs may be treated as peripheral devices to a casino communication controller and connected in a shared daisy chain fashion to a single serial interface and/or ethernet. In both cases, the peripheral devices are preferably assigned device addresses. If so, the serial controller circuitry must implement a method to generate or detect unique device addresses. In one embodiment, security-monitoring circuits detect intrusion into a player station or gaming station by monitoring security switches attached to access doors in a designated area, such as a player station cabinet. In one embodiment, access violations result in suspension of game play and can trigger additional security operations to preserve the current state of game play. These circuits also function when power is off by use of a battery backup. In one embodiment, as seen in FIG. 3A, the player station includes a sound generating device controlled by one or more sounds cards 358 which function in conjunction with the processor. In one embodiment, the sound generating device includes at least one and preferably a plurality of speakers 360 or other sound generating hardware and/or software for generating sounds, such as playing music for the primary and/or secondary game or for other modes of the player station, such as an attract mode. In one embodiment, the player station provides dynamic sounds coupled with attractive multimedia images displayed on one or more of the display devices to provide an audio-visual representation or to otherwise display full-motion video with sound to attract players to the player station. During idle periods, the player station may display a sequence of audio and/or visual attraction messages to attract potential players to the player station. The videos may also be customized for or to provide any appropriate information.

In one embodiment, the gaming system may include a sensor, such as a camera in communication with the processor (and possibly controlled by the processor) that is selectively positioned to acquire an image of a player actively using the player station and/or the surrounding area of the player station. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia. In another embodiment, the gaming system includes a wireless transceiver or a camcorder and the display segments are components of or are connected to televisions, satellites, DVD players, digital video recorders and Internet-enabled devices. In one embodiment, the game may be displayed on the central display and replicated on one or more the player stations. In another embodiment, the game is only displayed on the central display and the player station is only used to input decisions or commands in the game. In another embodiment, a primary or base game is displayed on the player station and/or the central display and one or more bonus games are displayed on the central display only. In one embodiment, the player stations provide other information to a player, such as the win/loss history of that certain games or the win/loss history of that player. It should be appreciated that the central display and the player stations may work together with a central controller or a plurality of servers to provide the games to the player in any suitable manner.

Figure 3B:
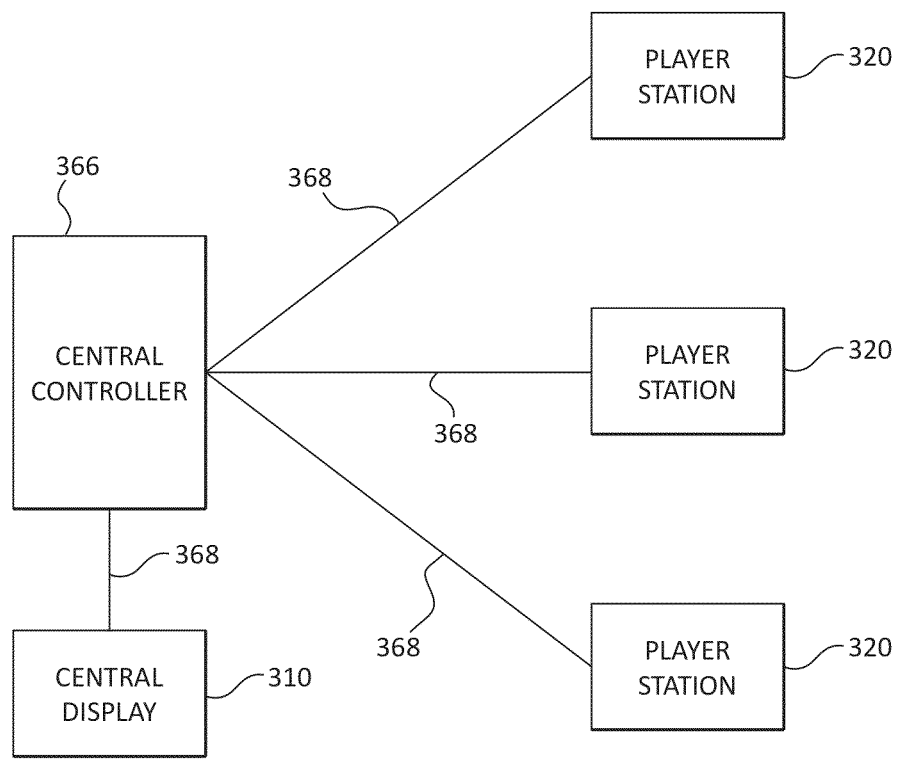
FIG. 3B is a block diagram illustrating player stations in communication with a central controller and a central display in communication with the central controller for use in the gaming device of FIG. 2, in which aspects of the present invention may be realized.

FIG. 3B is a block diagram illustrating a player station 320 in communication with a central controller and a central display 310 in communication with the central controller for use in the gaming device of FIG. 2, in which aspects of the present invention may be realized. In one embodiment, as illustrated in FIG. 3B, one or more of the player stations 320 are in communication with each other and/or at least one central server, central controller or remote host 366 through a data network or remote communication link 368. The central server, central controller or remote host is any suitable server or computing device, which includes at least one processor and at least one memory or storage device, and may also be in communication with a central display 310. In other embodiments, the central server is a progressive controller or a processor of one of the player stations in the gaming system. In these embodiments, the processor of each player station is configured to transmit and receive events, messages, commands, a current progressive value or any other suitable data or signal between the individual player station and the central server. The player station processor is operable to execute such communicated events, messages or commands in conjunction with the operation of the player station. Moreover, the processor of the central server is configured to transmit and receive events, messages, commands or any other suitable data or signal between the central server and each of the individual player stations. The central server processor is operable to execute such communicated events, messages or commands in conjunction with the operation of the central server. It should be appreciated that one or more of each of the functions of the central controller may be performed by one or more player station processors. It should be further appreciated that one, more or each of the functions of one or more player station processors as disclosed herein may be performed by the central controller. In one embodiment, the central controller has an Uninterruptible Power Supply ("UPS"). In one embodiment, the UPS is a rack mounted UPS module.

In one embodiment, the game outcome provided to the player is determined by a central server or controller and provided to the player at the player station. In this embodiment, each of the player stations is in communication with the central server or controller. Upon a player initiating game play at one of the player stations, the initiated player station communicates a game outcome request to the central server or controller. In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. The central server or controller is capable of storing and utilizing program code or other data similar to the processor and memory device of the player station. In an alternative embodiment, the central server or controller maintains one or more predetermined pools or sets of predetermined game outcomes. The central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes. The central server or controller communicates the generated or selected game outcome to the initiated player station. The player station receives the generated or selected game outcome and provides the game outcome to the player. In an alternative embodiment, how the generated or selected game outcome is to be presented or displayed to the player, such as a reel symbol combination of a player station or a hand of cards dealt in a card game, is also determined by the central server or controller and communicated to the initiated player station to be presented or displayed to the player. Central production or control can assist a gaming establishment or other entity in maintaining appropriate records, controlling gaming, reducing and preventing cheating or electronic or other errors, reducing or eliminating win-loss volatility.

In one embodiment, the player stations disclosed herein are associated with or otherwise integrated with one or more player tracking systems. In this embodiment, the player station and/or player tracking system tracks players gaming activity at the player station. In one such embodiment, the player station and/or associated player tracking system timely tracks when a player inserts their playing tracking card to begin a gaming session and also timely tracks when a player removes their player tracking card when concluding play for that gaming session. In another embodiment, rather than requiring a player to insert a player-tracking card, the player station utilizes one or more portable devices carried by a player, such as a cell phone, a radio frequency identification tag or any other suitable wireless device to track when a player begins and ends a gaming session. In another embodiment, the player station utilizes any suitable biometric technology or ticket technology to track when a player begins and ends a gaming session. During one or more gaming sessions, the player station and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. The player stations are capable of being connected together through a data network. In one embodiment, the data network is a local area network (LAN), in which one or more of the player stations are substantially proximate to each other and an on-site central server or controller as in, for example, a gaming establishment or a portion of a gaming establishment. In another embodiment, the data network is a wide area network (WAN) in which one or more of the player stations are in communication with at least one off-site central server or controller. The player stations may be located in a different part of the gaming establishment or within a different gaming establishment than the off-site central server or controller. Thus, the WAN may include an off-site central server or controller and an off-site player station located within gaming establishments in the same geographic area, such as a city or state. The WAN gaming system may be substantially identical to the LAN gaming system described above, although the number of player stations in each system may vary relative to each other.

In one embodiment, as a benefit to one or more of the gaming venues (e.g., a casino), using the player tracking system, along with use of the GPS positioning, for identifying the movements of the players throughout the gaming venues, identifying cash, money, credits, and award amounts spent along with various trends (e.g., historical) for generating visual graphs while displaying showing top view of the gaming venue (e.g., looking down from above the gaming venue) to improve casino layouts and identify patterns an movements of all types of players.

In another embodiment, the data network is an Internet or intranet. The operation of the player station can be viewed at the player station with at least one Internet browser. Operation of the player station and accumulation of credits may be accomplished with only a connection to the central server or controller (the internet/intranet server) through a conventional phone or other data transmission line, digital subscriber line (DSL), T-I line, coaxial cable, fiber optic cable, WIFI, or other suitable connection. Players may access an Internet game page from any location where an Internet connection and computer, or other Internet facilitator is available. The expansion in the number of computers and number and speed of Internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, the gaming system is in communication with a central server or controller. The central server or controller may be any suitable server or computing device, which includes at least one processor and a memory or storage device. In alternative embodiments, the central server is a progressive controller or another player station in the gaming system. In one embodiment, the memory device stores different game programs and instructions, executable by a player station processor, to control the player station. Each executable game program represents a different game or type of game, which may be played on one or more of the player stations in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the player station) or vice versa.

In this embodiment, one, all or a plurality of the player stations at least includes one or more display devices and/or one or more input devices for interaction with a player. A local processor, such as the above-described player station processor or a processor of a local server, is operable with the display device(s) and/or the input device(s) of one or more of the player stations. In operation, the central controller is operable to communicate one or more of the stored game programs to at least one local processor. In different embodiments, the stored game programs are communicated or delivered by embedding the communicated game program in a device or a component (e.g., a "chip" to be inserted in a player station), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the player station. That is, when a game program is communicated to a local processor, the local processor changes the game or type of game played at the player station or displayed on the display segment. Though the illustrated embodiments are described with the central controller determining a game result for the player and communicating that result to the central display 310 and one or more player stations, any other suitable game determining method may be employed in any embodiment of the present disclosure. In one embodiment, the central display 310 is associated with a central display 310 server. This central display 310 server determines the game outcome for the games played on each of the display segments. The central display 310 server communicates the game outcome to the central controller, which communicates the game outcome to one or more of the player stations.

In one embodiment, the central controller determines the award to provide to the player based on the game outcome. In another embodiment, the player stations determine the award and/or progress jackpot/value to provide to the players based on the game outcomes. In another embodiment, the central controller determines the game outcome displayed on the central display 310 and the player station determines any award and/or progress jackpot/value to provide to the player based on the game outcome. The player station determines both the game outcome and any award to provide to the player based on the game out come. In another embodiment, the central controller determines part of the outcome and the player station determines part of the outcome. That is, both the central controller and the player station determine part of a player's outcome and/or award.

Further, in the gaming industry, many different manufacturers make gaming machines and player stations. The communication protocols on the player station may be hard-wired into the player station and each player station/gaming machine manufacturer may utilize a different proprietary communication protocol. A player station manufacturer may also produce host systems, in which case their player stations are compatible with their own host systems. However, in a heterogeneous gaming environment, player stations from different manufacturers, each with its own communication protocol, may be connected to host systems from other manufacturers, each with another communication protocol. Therefore, communication compatibility issues regarding the protocols used by the player stations in the system and protocols used by the host systems must be considered.

In another embodiment, player stations at one or more gaming sites may be networked to a central server in a progressive configuration, wherein a portion of each wager to initiate a base or primary game may be allocated to bonus or secondary event awards. In one embodiment, a host site computer is coupled to central servers at a variety of mutually remote gaming sites for providing a multi-site linked progressive automated gaming system. The host site computer may serve player stations distributed throughout a number of properties at different geographical locations including, for example, different locations within a city or different cities within a state. The host site computer may be maintained for the overall operation and control of the system. A host site computer may oversees the entire progressive gaming system and may be the master for computing all progressive jackpots and values for each and every gaming device. All participating gaming sites report to, and receive information from, the host site computer. Each central server computer may be responsible for all data communication between the player station hardware and software and the host site computer. An individual player station may trigger a progressive win, for example through a game play event such as a symbol-driven trigger in the multi-component game. The central server or other central controller determines when a progressive win is triggered. The central controller and an individual player station may work in conjunction with each other to determine when a progressive win is triggered, for example through an individual player station meeting a predetermined requirement established by the central controller. The progressive award win may be triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a player station is randomly or apparently randomly selected to provide a player of that player station one or more progressive awards. In one such embodiment, the player station does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game. In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards).

In one such embodiment, the greater the players' wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner. In another embodiment, one or more of the progressive awards are partially funded via a side-bet or side-wager, which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed. In one alternative embodiment, a minimum wager level is required for a player station to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, players at a linked player stations in a gaming system participate in a group gaming environment. In one embodiment, players at linked player stations work in conjunction with one another, such as playing together as a team or group, to win one or more awards. In one such embodiment, any award won by the group is shared, either equally or based on any suitable criteria, amongst the different players of the group. In another embodiment, players linked player stations compete against one another for one or more awards. In one such embodiment, players at linked player stations participate in a gaming tournament for one or more awards. In another embodiment, players at linked player stations play for one or more awards wherein an outcome generated by one player station affects the outcomes generated by one or more linked player stations.

Figure 4:
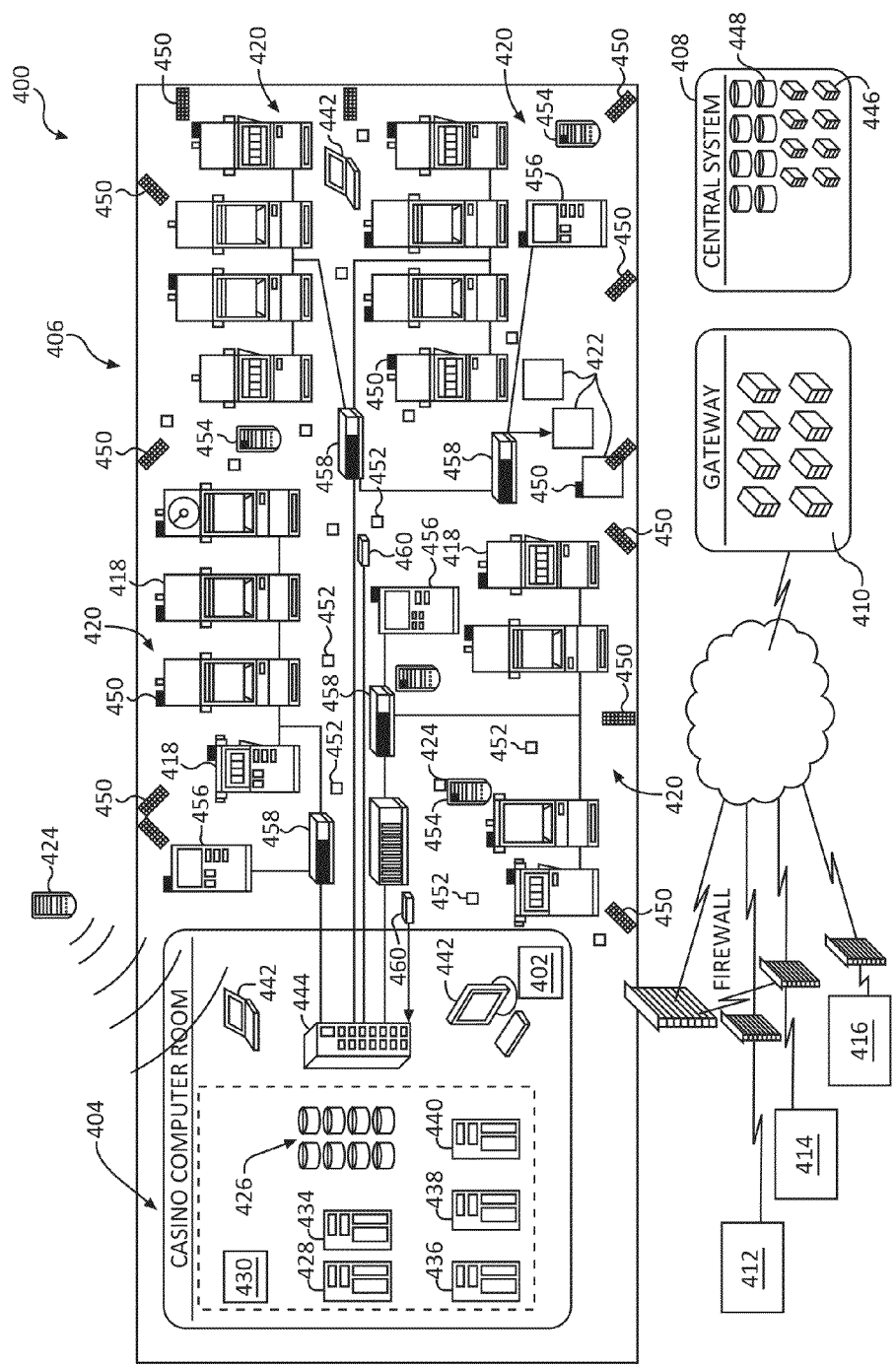
FIG. 4 is a schematic block diagram of a server-based gaming network in which aspects of the present invention may be realized.

FIG. 4 is a schematic block diagram of a server-based gaming network 400 in accordance with an exemplary embodiment of the present invention. In the exemplary embodiment, network 400 includes a slot floor mix recommendation system 402 incorporated therein. In one embodiment, slot floor mix recommendation system 402 is a stand-alone system communicatively coupled to network 400. In various embodiments, slot floor mix recommendation system 402 is incorporated within various components of network 400. Network 400 provides methods and devices for managing one or more networked gaming establishments. Network 400 may be embodied in what is known as a server-based gaming network, sbX™ network. For example, in one embodiment, a host may be included in the network, such as a server-based gaming network. For example, a gaming server (e.g., an sbX™ server) may be an example of the host. The gaming server (e.g., the sbX™ server) may be a set of servers running central applications and may attach as the host to EGMs via the gaming network. In one embodiment, a host, operating in the gaming network, may be a server (e.g., an sbX™ server) managing and controlling the gaming network (e.g., an sbX™ network). In one embodiment, the host, operating in the gaming network, may monitor the monetary activity of the EGM. The host may track any error conditions on the EGM. The host may configure the EGM such as to enable/disable games, download games, and configure game parameters (denomination, payback, etc.). For example, a gaming management solution (e.g., IGT® sbX™ gaming management solution) may be a server-based system to act as a repository for all game content that may be downloaded to EGMs giving each EGM instant access to the technology within the EGM's environment. The game software, random number generator and game logic are controlled by the EGM. This significantly increases configuration speed so that games may be adapted and seamlessly integrate analytics to the database in minutes. Game titles are accessed from the server using a floor manager (e.g., IGT Floor Manager®), running on the host, and allow operators to reconfigure their gaming floor almost instantly. In one embodiment, the floor manager, operating on the host, is a G2S-compliant game-to-system management solution that enables operators to remotely change the game mix on the casino floor. In one embodiment, the floor manager application provides operators with sophisticated and user-friendly visualization tools to analyze terminal (e.g., the EGM) and game performance in real-time. Using Quick Change functionality (QCF), the floor manager, running on the host server(s), enables operators to rapidly locate low performing games, select a new theme from the game library and download the new theme on the EGM in the gaming venue floor within minutes. The software displays a map of the casino floor and highlights EGMs color-coded to indicate performance. Operators can select individual terminals and receive analysis at terminal-, multi-game and single-game level, based on KPIs such as coin-in, actual win and occupancy of game. In one embodiment, the floor manager application is a gateway to a game-to-system library allowing operators to quickly schedule changes or switch between themes. Once selected, the game's configurations can be set including denomination, max bet and even volume and credit limits on the EGM. For example, new gaming industry-leading themes may be added to the game library every month and the floor manager application provides rapid deployment to the gaming floor to ensures an EGM will maintain high performance and continually provide the user with newer and advanced games to add to the users favorite and/or preferred games. In one embodiment, the quick recognition and eradication of low performing games and ability to respond to consumer requests on the floor, empowers a gaming venue to concentrate on player satisfaction and gaming experience.

In addition, with the sbX™ gaming management, as each EGM connected to the system is self-sufficient, if there is a malfunction or connectivity fault, information is backed up at the individual EGM for a predetermined period of time (e.g., two weeks), ensuring no data loss. Once the problem is resolved and the EGM is re-connected to a server, the backed-up data is instantly dropped into the database. Operators now have the ability to run their own choice of games on any interconnected terminal in the gaming venue. This allows management to switch between games at any time, delivering an unmatched level of flexibility and control over their gaming environment. Users are also able to select the games (e.g., a favorite and/or preferred EGM) and denominations they wish to play at the terminal. In one embodiment, the sbX™ gaming management system delivers a flexible and diversified approach to management and control of the casino floor, reconfiguring gaming machines at the appropriate time and schedule. For example, in one embodiment, all EGMs connected to the server are granted full access to themes held in a games depository and operators can reconfigure each terminal remotely from the workstation. A Games Library may be included and may contain over 300 gaming titles in a game-to-system depository. In one embodiment, the sbX™ gaming management application allows for games to be updated in minutes and with this simple configuration process in place, operators can place better focus on in-depth player statistics. Accurate information in real-time optimizes marketing strategies, to provide the ultimate gaming experience and ensure the floor remains dynamic. Instantaneous analysis and decisions may be implemented to adjust elements and increase user satisfaction and loyalty. This also enables a gaming venue to ensure users are able to play the latest content available. Various game themes can be changed, tested and reverted in different areas of the gaming venue with rapid execution. In one embodiment, the sbX™ application and its integrated modules provide for data analysis and also focus on player experience thereby allowing for the development of innovative marketing programs. For example, in one embodiment, certain banks of machines may be adapted to a featured game, linked to a proprietary progressive jackpot and then heavily promoted during certain times. Thus, these games may become a favorite and preferred EGM during a particular time. Following the promotion, the EGMs can quickly be restored to their original games. In one embodiment, the sbX™ system may be driven by IGT's Advanced Video Platform (AVP®) with the technology seamlessly integrated with all modules, permitting fast connectivity and advanced capabilities. In addition, GSA open protocols are used so that sbX™ applications are interoperable with third-party devices that have also adopted GSA open protocols.

Thus, in one embodiment, if a demand for a particular type of the EGM is in high demand (e.g., multiple users are selecting a favorite and/or preferred game on a particular EGM) but the supply of the favorite and/or preferred game on a particular EGM is low, the floor manager application provides the ability to quickly (e.g., within minutes) update and replace the EGM's having low performing games and/or non-preferred games on the EGM with the higher performing and/or favorite and preferred game on a particular EGM.

In one embodiment, network 400 permits the convenient provisioning of networked gaming machines and other devices relevant to casino operations. Game themes may be easily and conveniently added or changed, if desired. Related software, including but not limited to player tracking software and peripheral software may be downloaded to networked gaming machines, mobile gaming devices, thin clients and/or other devices, such as kiosks, networked gaming tables, player stations.

In some implementations, servers or other devices of a central system will determine game outcomes and/or provide other wager gaming functionality. In some such implementations, wagering games may be executed primarily on one or more devices of a central system, such as a server, a host computer, etc. For example, wager gaming determinations, such as interim and final game outcomes and bonuses, may be made by one or more servers or other networked devices. Player tracking functions, accounting functions and some display-related functions associated with wagering games may be performed, at least in part, by one or more devices of a casino network and/or of a central system.

In the exemplary embodiment, network 400 includes a casino computer room 404 and networked devices of a gaming establishment 406. Gaming establishment 406 is configured for communication with a central system 408 via a gateway 410. Other gaming establishments 412, 414, and 416 are also configured for communication with central system 408.

Gaming establishment 406 includes multiple gaming machines 418. Some of gaming machines 418 form a cluster or "bank" 420 of gaming machines 418. Gaming machines 418 are configured for communication with one or more devices of casino computer room 404 or similar devices disposed elsewhere in gaming establishment 406. Some of gaming machines 418 may be configured to read from, and/or write information to, a portable instrument such as but not limited to, a ticket and a player loyalty device. In one embodiment, gaming establishment 406 also includes a bank of networked gaming tables 422. However, network 400 may be implemented in gaming establishments having any number of gaming machines, gaming tables, etc. It will be appreciated that many gaming establishments 406 include hundreds or even thousands of gaming machines 418, gaming tables 422 and/or mobile devices 424, not all of which are necessarily associated bank 420 and some of which may not be connected to network 400. At least some of gaming machines 418 and/or mobile devices 424 may be "thin clients" that are configured to operate, at least in part, according to instructions from another device (such as a server).

Multiple storage devices 426, sbX™ server 428, License Manager 430, servers 434, 436, 438, and 440, host device(s) 442, and main network device 444 are disposed within computer room 404 of gaming establishment 406. In practice, more or fewer devices may be used. Depending on the implementation, some such devices may reside elsewhere in gaming establishment 406.

One or more of the devices in computer room 404 (or similar devices disposed elsewhere in gaming establishment 406 or in gaming establishment 412, 414, or 416) may be configured to provide functionality relevant to embodiments of the present invention. For example, one or more of servers 434, 436, 438, or 440 may be configured for communication with gaming machines 418 that are configured to provide a subset of themes for selection by a player. For example, one or more such servers may be configured to provide a selection of a subset of four themes from a large number of available themes.

Accordingly, in some embodiments at least some gaming establishments may be configured for communication with one another. In this example, gaming establishments 412, 414, and 416 are configured for communication with casino computer room 404. Such a configuration may allow devices and/or operators in casino 406 to communicate with and/or control devices in other casinos. In some such implementations, a server (or another device) in computer room 404 may be configured to communicate with and/or control devices in gaming establishments 412, 414, and 416. Conversely, devices and/or operators in another gaming establishment may communicate with and/or control devices in casino 406.

Some of these servers in computer room 404 may be configured to perform tasks relating to accounting, player loyalty, bonusing/progressives, configuration of gaming machines, etc. A Radius server and/or a DHCP server may also be configured for communication with the gaming network. In various embodiments, sbX™ server 428 and the other servers shown in FIG. 4 include or are in communication with clustered CPUs, redundant storage devices, including backup storage devices, switches, etc. Such storage devices may include a redundant array of independent disks (RAID) array, back-up hard drives and/or tape drives, etc.

In various embodiments, many of these devices (including but not limited to License Manager 430, servers 434, 436, 438, and 440, and main network device 444) are mounted in a single rack with sbX™ server 428. Accordingly, many or all such devices will sometimes be referenced in the aggregate as an "sbX™ server." However, in alternative implementations, one or more of these devices is in communication with sbX™ server 428 and/or other devices of the network but located elsewhere. For example, some of the devices could be mounted in separate racks within computer room 404 or located elsewhere on the network. Moreover, in some implementations large volumes of data may be stored elsewhere, e.g., via a storage area network ("SAN").

Computer room 404 may include one or more operator consoles or other host devices that are configured for communication with other devices within and outside of computer room 404. Such host devices may be provided with software, hardware and/or firmware for implementing functions described herein. However, such host devices need not be located within computer room 404. Wired host devices 442 (which are desktop and laptop computers in this example) and wireless devices 424 (which are PDAs in this example) may be located elsewhere in gaming establishment 406 or at a remote location.

Some embodiments include devices for implementing access control, security and/or other functions relating to the communication between different devices on the network. One or more devices in central system 408 may also be configured to perform, at least in part, tasks specific to embodiments of the present invention. For example, one or more servers 446, storage devices and/or host devices 442 of central system 408 may be configured to implement the functions described in detail elsewhere herein. One or more servers 446, storage devices 448 and/or host devices 442 of central system 408 may maintain player account information.

Some gaming networks 400 provide features for gaming tables that are similar to those provided for gaming machines, including but not limited to bonusing, player loyalty/player tracking, the use of cashless instruments, etc. Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras 450, radio frequency identification devices 452 and 454, etc., may be used to identify and/or track patrons, playing cards, chips, etc. Some of gaming tables 422 may be configured for communication with individual player terminals (not shown), which may be configured to accept bets, present an electronic representation of a dealer, indicate game outcomes, etc.

Moreover, some such automated gaming tables 422 and/or associated player terminals may include, or may be configured for communication with, a device that includes a coin-out meter, a ticket reader, a card reader, a ticket printer, and/or other related features. In some implementations, one such device may provide such functionality to a plurality of automated gaming tables 422 and/or associated player terminals.

Gaming establishment 406 also includes networked kiosks 456. Kiosks 456 may include card readers, ticket readers, printers, a user interface system, one or more displays, etc. Depending on the implementation, kiosks 456 may be used for various purposes, including but not limited to cashing out, prize redemption, redeeming points from a player loyalty program, redeeming "cashless" indicia such as bonus tickets, smart cards, etc.

Kiosks 456 may be configured to read information from, and/or write information to, a portable instrument such as a smart card, a ticket, a card having a magnetic strip, etc. The corresponding gaming devices are preferably configured for communication with such kiosks 456 and vice versa. Accordingly, some such kiosks 456 may include a wireless interface that is configured for communication with mobile gaming devices 424.

In the exemplary embodiment, each bank 420 has a corresponding switch 458. Each switch 458 is configured for communication with one or more devices in computer room 404 via main network device 444, which combines switching and routing functionality in this example. Although various communication protocols may be used, some preferred implementations use the Gaming Standards Association's G2S Message Protocol. Some systems may use a gaming-industry-specific transport layer called CASH™, which offers additional functionality and security.

Gaming establishment 406 may also include an RFID network, implemented in part by RFID switches 460 and multiple RFID readers 452. An RFID network may be used, for example, to track objects such as mobile gaming devices 424, which include RFID tags 454, patrons, chips, player loyalty devices, etc., in the vicinity of gaming establishment 406.

Various alternative network topologies can be used to implement different aspects of the invention and/or to accommodate varying numbers of networked devices. For example, some gaming establishments may include cameras 450 for implementing advanced player tracking, player navigation or other functionality. Gaming establishments with large numbers of gaming machines 418 may require multiple instances of some network devices (e.g., of main network device 444, which combines switching and routing functionality in this example) and/or the inclusion of other network devices not shown in FIG. 4. Some embodiments may include one or more middleware servers disposed between kiosks 456, RFID switches 460 and/or bank switches 458 and one or more devices (e.g., a corresponding server, router or other network device) in computer room 404. Such middleware servers can provide various useful functions, including but not limited to the filtering and/or aggregation of data received from switches, from individual gaming machines and from other devices. Some implementations of the invention include load-balancing methods and devices for otherwise managing network traffic.

In one embodiment, using the embodiments described herein, a Personal Electronic Devices (PED) and/or other type of mobile device (e.g., a mobile digital device, digital media extender, a smart phone, an electronic tablet, a player mobile device 'PMD', a computer, and the like) may be used for dynamically configuring a gaming device by employing a service window application, and the present invention may use a variety of communication protocols such as near field communication (NFC), Bluetooth or other wireless communications sampling information from the mobile device that is connected to a gaming network for use by at least one EGM included in the gaming network, particularly using the information window (e.g., a service window) of the EGM, which may be operated by and/or in communication with an sbX™ server 428, central system 408, servers 446, a main network device 444, storage devices and/or host devices 442 of central system 408 may be configured to implement the functions described in detail elsewhere herein) and/or via the external application. In one embodiment, the wireless communication may go directly to the processing unit on a particular and identified EGM being in communication with and/or controlled by a sbX™ server 428, central system 408, servers 446, a main network device 444, storage devices and/or host devices 442 of central system 408 may be configured to implement the functions described in detail elsewhere herein. The EGM may be configured with a hardware device (e.g., those described in FIG. 4) that communicates with the PMD. The EGM, using a service window application, may contain a device that communicates with a bill acceptor or printer to simulate bills and tickets. The EGM may have a device (software and/or hardware) that communicates with a back end host that ultimately uses SAS or G2S to move the money to and from the particular and identified EGM. This configuration allows all of EGMs to be retrofitted for mobile payments.

In one embodiment, when an actual wireless transfer occurs via a mobile device, money is electronically moved virtually from an identified and/or a preferred EGM employing the service window application to the PED or vice versa. The transfer process asks the player to trust the new technology in order to gain a players confidence due to this lack of trust. In this way, the players trust is gained and an audit trail is provided by the service window application controlled by and/or in communication with the sbX™ server 428, the central system 408, servers 446, the main network device 444, storage devices and/or host devices 442 of central system 408 to implement the present invention described herein. An email or text can be sent via the EGM, the sbX™ server 428, the central system 408, servers 446, the main network device 444, and/or storage devices and/or host devices 442 of central system 408 with the details of the transfer. In one embodiment, the player may cash out to their PED and then immediately receive and view an email on the PED indicating that the transfer occurred from an EGM. The transfer verification email may provide all of the details (date, time, amount, EGM, the gaming venue location, and/or property, etc.) regarding the monetary transfer. The email may be sent for transfers to and from the EGM employing the service window application.

The transfer verification message may be used for performing, authenticating, and preventing fraud of the mobile transfer of the money to and from the EGM employing the service window application in communication with the sbX™ server 428, the central system 408, servers 446, the main network device 444, storage devices and/or host devices 442 of central system 408 to implement the present invention described herein. In one embodiment, each EGM may have specific and unique identifiers, which may be displayed in the service window application, and this identifying information of the EGM may be included in the transfer verification message sent via the sbX™ server 428, the central system 408, servers 446, the main network device 444, and/or host devices 442 of central system 408 described herein. Moreover, the transfer verification message may include any and all information that is used and displayed in the service window, and be associated with a players account information, the EGM, a geolocation information of the EGM (e.g., the physical location of the EGM in a gaming venue), serial numbers of the EGM, biometric data (e.g., a fingerprint taken from the PED, the EGM, and/or other location, and uploaded, verified, included with the transfer verification message), geolocation information of the mobile device, banking account information, information regarding a bank level/bank of EGM's, and/or other verifiable data relating to the EGM and money transfer to be included in the transfer verification message associated with the money transfer. In one embodiment, each EGM may have specific and unique identifiers, and this identifying information of the EGM may be included in the transfer verification message sent via the sbX™ server 428, the central system 408, servers 446, the main network device 444, and/or host devices 442 of central system 408 described herein.

In one embodiment, prior to completing the mobile transfer payment, the transfer verification message requires the player to respond back to the request, using the sbX™ server 428, the central system 408, servers 446, the main network device 444, and/or host devices 442 of central system 408 described herein, for approval of the mobile payment transfer from the player. Upon responding back to the request for approval of the mobile payment transfer, the mobile payment is electronically transferred from the EGM, employing the service window application, using the sbX™ server 428, the central system 408, servers 446, the main network device 444, and/or host devices 442 of central system 408 described herein, to the financial institution and/or player account, and/or electronically transferred from the financial institution and/or player account to the EGM via the mobile device. In one embodiment, the request for approval requires the data included in the transfer verification message to be verified and/or validated by the player. The transfer verification message may include a confirmation number for the mobile payment transfer.

Figure 5:
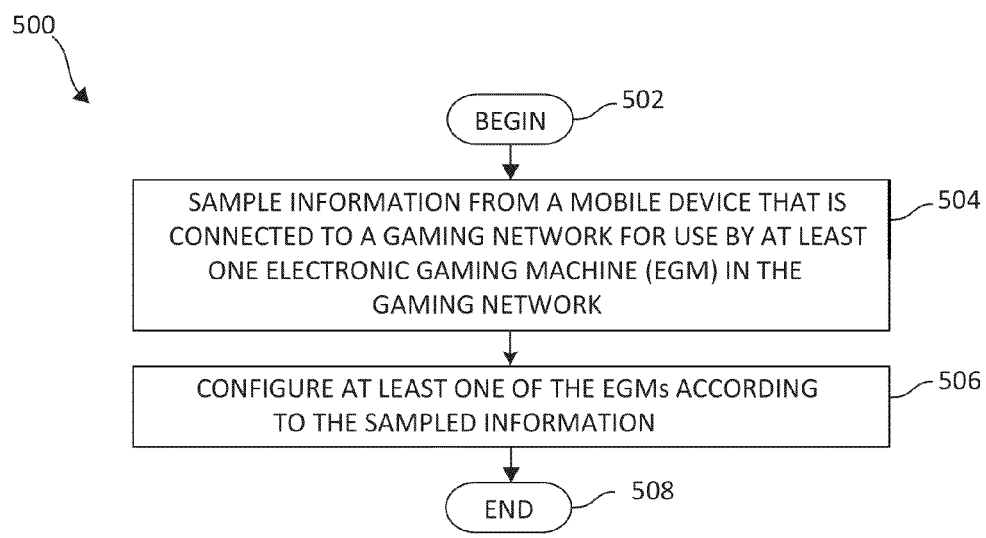
FIG. 5 is a flow chart illustrating an exemplary method for transfer verification of mobile payments in a gaming system in which aspects of the present invention may be realized.

FIG. 5 is a flow chart illustrating an exemplary method 500 for dynamically configuring a gaming device in a gaming system in which aspects of the present invention may be realized. The method 500 begins (step 502) by sampling information from a mobile device that is connected to a gaming network by at least one electronic gaming machine (EGM) in the gaming network (step 504). The method 500 configures at least one of the EGMs according to the sampled information (step 506). The method 500 ends (step 508).

Figure 6:
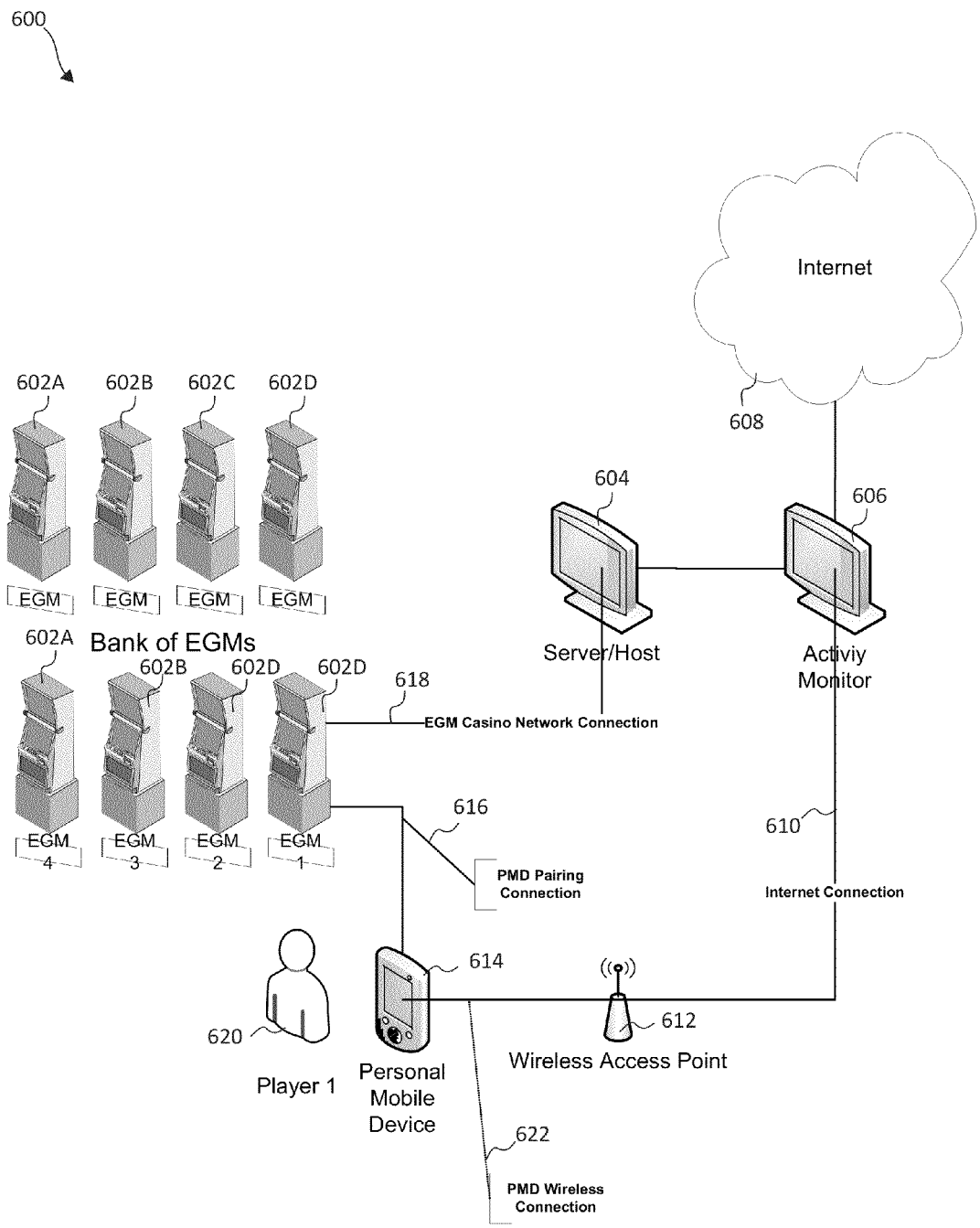
FIG. 6 is a block diagram illustrating an alternative gaming system which contains multiple EGMs in which aspects of the present invention may be realized.

Turning now to FIG. 6, a block diagram illustrating a gaming system 600 that contains multiple EGMs in which aspects of the present invention may be realized is depicted. Players 620, operators and regulators (collectively illustrated in FIG. 6 as 'player 1') have personal mobile devices (PMD) 614 that are used for various operations on the casino network 618 and the EGMs 602 (illustrated in FIG. 6 as 602A-D). Specifically the PMDs 614 allow the players 620 to communicate with the EGM 602 at which they are seated to access game or player account features. The players 620 can also use their PMDs 614 to access the network 618 of the casino or the Internet 608, using, for example, the wireless access point 612 for the Internet connection 610. The players 620 may use the web browser on their device 614 or applications installed on their device 614 that access the networks 618, 608.

As illustrated in FIG. 6, the player 620 is using EGM1 602D that is at a bank of EGMs 602. The player 620 has a PMD 614 that has wireless capabilities (such as 802.11 or Bluetooth) and can connect and communicate with the Wireless Access Point (WAP) 612. In one embodiment, the WAP 612 is a commodity, off the shelf device. In one embodiment, the player 620 has a player tracking card or player account at the gaming venue. The server/host 604 shown is part of the casino service based system and/or host system. In one embodiment, the activity of the personal mobile device 614 is monitored by an activity monitory 606 that is in communication with the server/host 604. In one embodiment, the PMD 614 may be directly paired with at least one of the EGMs 602 using the pairing connection 616.

Figure 7:
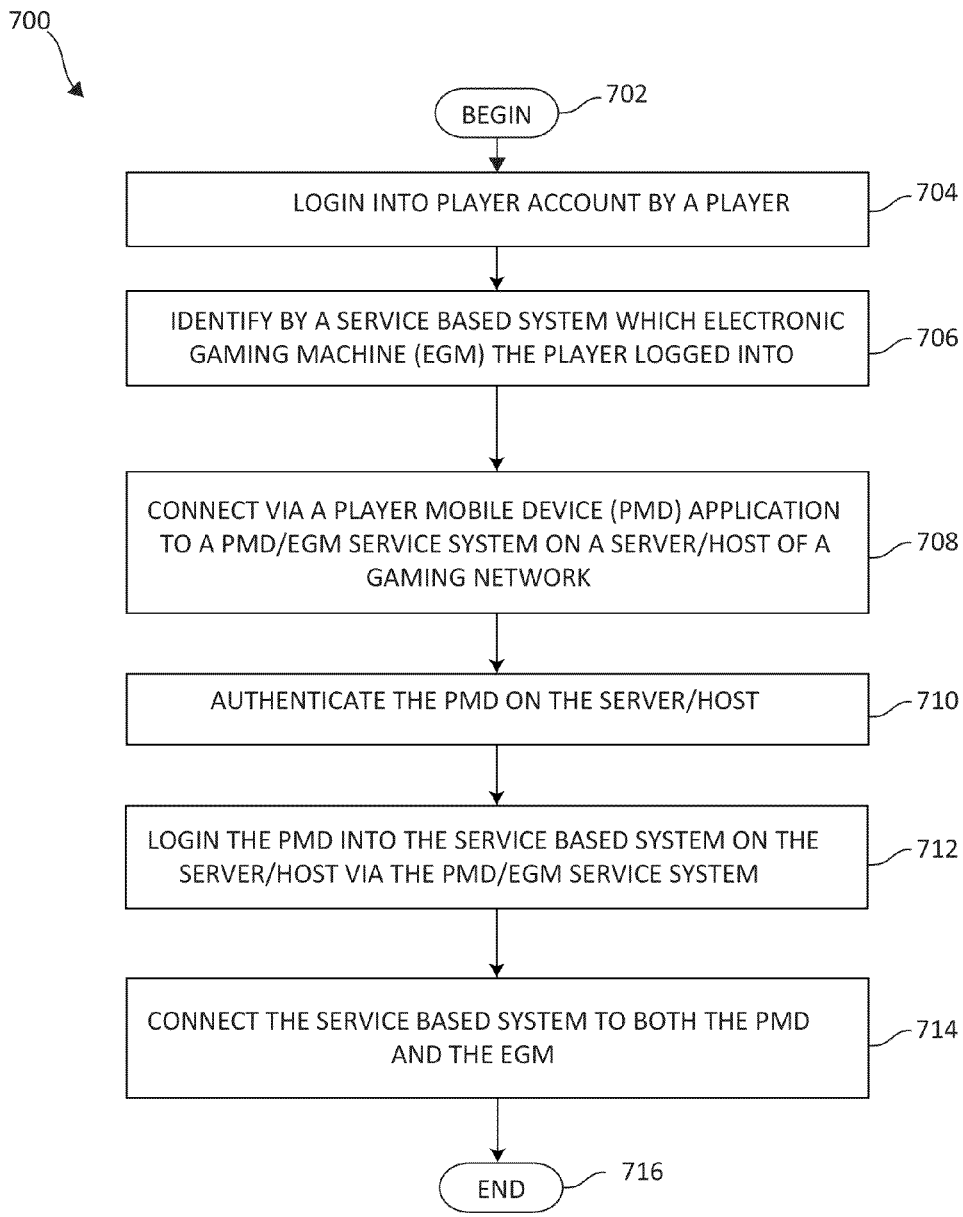
FIG. 7 is a flow chart illustrating an exemplary method for accessing a gaming system using a personal mobile device (PMD) in which aspects of the present invention may be realized.

FIG. 7 is a flow chart illustrating an exemplary method 700 for accessing a gaming system using a personal mobile device (PMD) in which aspects of the present invention may be realized. The method 700 begins (step 702) with a player login to a player account of at least one or more gaming venues (step 704). For example, in one embodiment, they player may login to the player account by 1) a player inserts player card in EGM, 2) a player inserts the player card in the EGM and enters a PIN number, and/or 3) a player login to the player account by entering information at the EGM. The method 700 identifies by a served based system which of the electronic gaming machines (EGM) the player logged into based on step 704 (step 706)). In one embodiment, the service-based system now knows which EGM the player is at based on the preliminary step of step 704. The method 700 connects, via a player mobile device (PMD) application, to a PMD/EGM service system on a server/host of a gaming network (step 708). In one embodiment, the player starts an operator and/or EGM vendor application (app) on PMD which is 1) an application specific to the player's PMD, and/or 2) an internet webpage accessed from the PDM. The method 700 authenticates the PMD on the server/host (step 710). In one embodiment, the PMD application connects to PMD/EGM service on the Sever/Host (see FIG. 6 604). In one embodiment, the player authenticates the PMD with the Sever/Host by 1) entering an account and password, 2) automatically using a media access control (MAC) address of the PMD, and/or other unique information for the PMD and player. The PMD is login to the service based system on the server/host via the PMD/EGM service system (step 712). In one embodiment, the PMD/EGM service logins the PMD in service based system on the Sever/Host. At this point, the service-based system is now connected to both the PMD and the EGM (step 714). The method 700 ends.

It should be noticed that there is no need for direct wired and/or wireless communication between the EGM and PMD. At this point the connection goes through the Host (see FIG. 6 604). With this connection the EGM and PMD can communicate and reflect the state of each other. In other words, the EGM and the PMD may be synchronized. For example, from the PMD, the player could see the game credits, account information, bonus game state, etc. On the other hand, from the EGM, the player could see the content on the players PMD (e.g., music, pictures, contacts, etc.).

After successfully reaching step 714 of FIG. 7, as described above, the host (see FIG. 6 604) may now facilitate mobile gaming and mobile applications for the player at the EGM. The host may act as proxy and forward information between both the EGM and the PMD. The host can serve up bonus or account content. Once the player's PMD is associated with the EGM, the gaming system may customize the EGM experience based on the PMD usage. Specifically, the host system may monitor the network activity of the player through the wireless access point (e.g., FIG. 6 612) ad make decisions about how to customize the EGM experience for the player.

Game Selection Menu

In one embodiment, the EGM has a game selection menu that shows the player the games, paytables and denominations configured on the EGM to play. The host system in the gaming network may customize this menu based on the player's network activity. For example if the player is visiting an internet website (e.g., PokserStars.com), the host may configure the EGM to show poker games. The host may configure the denomination, language, and the like, based on the information sampled from the mobile device by the host. For example, if the host identifies from the sampled (sampled in real time) data that a player is accessing a spanish language website, the host may configure the EGM for spanish. In one embodiment, if the host identifies the player visiting a particular store (e.g., Neiman Marcus), the host may customize the denominations accordingly. For example, the denomination the player uses can be configured as needed. In one embodiment, a normal EGM (e.g., a majority of EGMs having a low denomination value) may have 5, 25, 50 cent (e.g., U.S. dollar) denominations. In a high roller area (e.g., large denomination gaming area) the EGMs may be configured for 100, 500, and/or 1000 currency (e.g., U.S. dollar) denominations. So in this example, if the player is visiting a website associated with wealth and/or high spending (Neiman Marcus in this example), the EGM might be configured as a high roller area EGM and therefore configured for denominations of 100, 500 and 1000 dollars. In one embodiment, the present invention identifies the value of the goods and services associated with a variety of websites and customizes the EGM based on the player's network activity associated with the visited websites. Moreover, the service window application associated with the EGM may also be customized, based on the player's network activities, and offer different options, services, events, activities, and/or other items available. For example, using the example above where the player is visiting a Neiman Marcus website, the service window application may alter the service options such as changing restaurant options from lower priced value meals/services to restaurants (e.g., 5 star restaurants) offering more luxurious meals and/or services.

Service Window

In one embodiment, the service window, as described above, is an application on the EGM that allows the player to order drinks, buy show tickets, buy buffet ticket, and/or access the player's player account, and the like. The service window may be customized based on the player PMD network activity via the sampled, harvested, and/or collected data. For example if the player is searching for "Best Buffet in Vegas", the sampled data allows for the service window to advertise the restaurants in the casino and/or offer a special deal on one or more restaurants. The service window may offer the player shopping opportunities based on the web activity. For example if the player were searching for a new shirt, the service window may advertise a clothing shop in or near the gaming venue.

The host may detect that the player is searching for information about a current event, such as a sporting event. The service window might then provide continous updates about the event. The service window might provide live or recorded video of the event.

Applications on the PMD

In one embodiment, the customization is not limited to internet web browsing from the PMD. The player may use an application on the PMD that also accesses the gaming network and provides opportunities for customization. For example, the player may be playing an online game with the PMD. The host may identify this game traffic and customize the EGM to match the style of online game.

During Game Play

In one embodiment, the host may see that the player is actively using the PMD to browse the gaming and/or non-gaming network. If a bonus or other significant game event occurs, the player may be distracted. The EGM may be notified to get the player's attention.

The game volume, speed, bonus events and/or multimedia elements may be configured based on the network activity of the PMD. For example the graphical theme of the game may be configured to match the network activity. For example, if the player is visiting a favorite sports team (e.g., the Dallas Cowboys®, the EGM game theme may be altered to be football, sports, Texas, and/or specifically the Dallas Cowboys®. In other words, the gaming theme may be altered and/or synchronized from a voluminous storage of game themes to match data relating to the activity of the PMD.

Other Uses

In one embodiment, the host may determine a player's interest level based on the network activity. For example if the player is reading the news and/or searching the internet from the PMD, the host may determine that the player is bored, distracted, and or not interested in the current game provided by the EGM. The host may use this as an opportunity to offer a different game to the player directly and/or by configuring the player selection. In one embodiment, the EGM may provided a notification and/or a request via the host to the PMD asking if the player would like a new and/or different game. One or more gaming options may be offered to the PMD based on the PMD activity thereby relating more relevant gaming options to the player.

Figure 8:
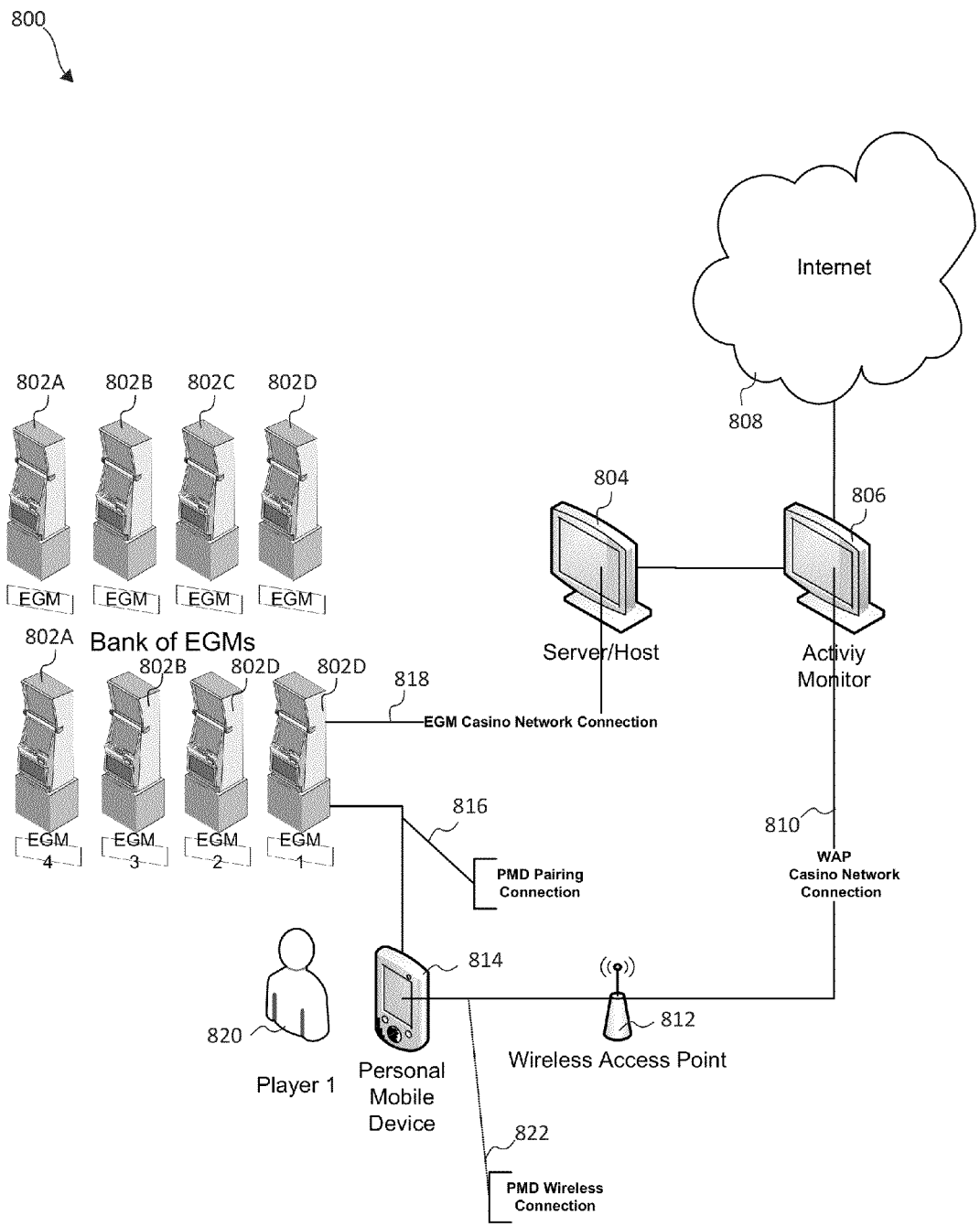
FIG. 8 is a block diagram illustrating an alternative gaming system which contains multiple EGMs in which aspects of the present invention may be realized.

FIG. 8 is a block diagram illustrating an alternative gaming system 800 which contains multiple EGMs in which aspects of the present invention may be realized. Players 820, operators and regulators (collectively illustrated in FIG. 8 as 'player 1') have personal mobile devices (PMD) 814 that are used for various operations on the casino network 818 and the EGMs 802 (illustrated in FIG. 8 as 802A-D). Specifically the PMDs 814 allow the players 820 to communicate with the EGM 802 at which they are seated to access game or player account features. The players 820 can also use their PMDs 814 to access the EGM casino network connection 818 of the casino or the Internet 808, using, for example, the wireless access point 812 for the wireless access point (WAP) casino network connection 810. The players 820 may use the web browser on their device 814 or applications installed on their device 814 that access the networks 818, 808. =

As illustrated in FIG. 8, the player 820 is using EGM1 802D, which is at a bank of EGMs 802. The player 820 has a PMD 814 that has wireless capabilities (such as 802.11 or Bluetooth) and can connect and communicate with the Wireless Access Point (WAP) 812. In one embodiment, the WAP 812 is a commodity, off the shelf device. In one embodiment, the player 820 has a player tracking card or player account at the gaming venue. The server/host 804 shown is part of the casino service based system and/or host system. In one embodiment, the activity of the personal mobile device 814 is monitored by an activity monitor 806 that is in communication with the server/host 804. In one embodiment, the PMD 814 may be directly paired with at least one of the EGMs 802 using the pairing connection 816. It is possible that the player 820 directly pairs with the EGM using the PMD pairing connection 816. Here the player directly pairs 816 their PMD with one of the EGMs 802. In one embodiment, Low Power Bluetooth may be used. In one embodiment, the direct pairing is achieved with Near Field Communcations (NFC). With NFC the player swipes their PMD at a designated location on the EGM. The EGM and PMD exchange information that the EGM and/or PMD use to establish a second communications link that has a higher bandwidth and better signal strength than NFC.

Figure 9:
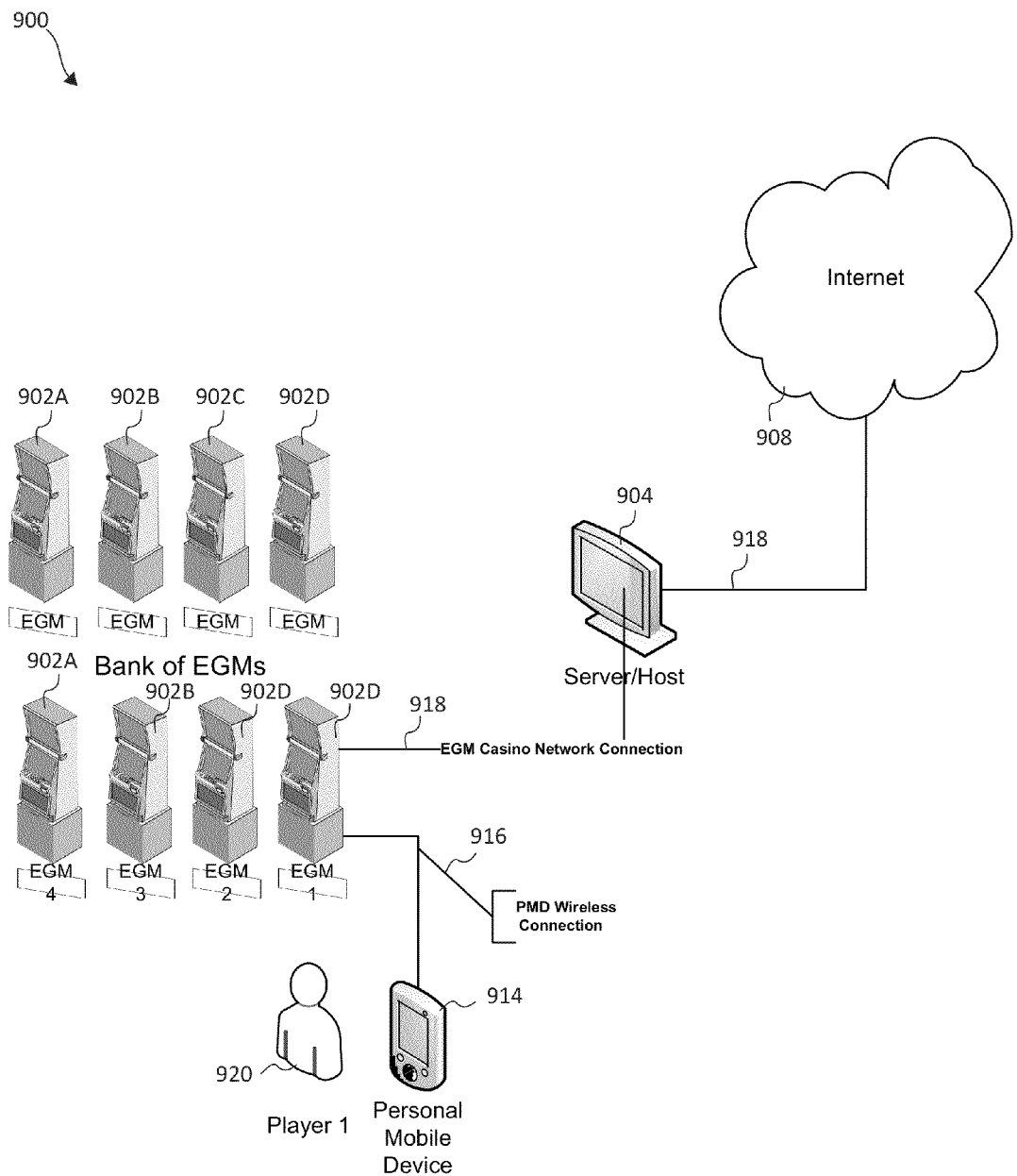
FIG. 9 is a block diagram illustrating an alternative gaming system with direct pairing which contains multiple EGMs in which aspects of the present invention may be realized.

FIG. 9 is a block diagram illustrating an alternative gaming system with direct pairing which contains multiple EGMs in which aspects of the present invention may be realized. In FIG. 9, the network of the gaming system is displayed without the WAP and using the EGM as the WAP. The decisions about the network activity still happen at the host but could also happen at the EGM Players 920, operators and regulators (collectively illustrated in FIG. 9 as 'player 1') have personal mobile devices (PMD) 914 that are used for various operations on the casino network 918 and the EGMs 902 (illustrated in FIG. 9 as 902A-D). Specifically the PMDs 914 allow the players 920 to communicate with the EGM 902 at which they are seated to access game or player account features. The players 920 can also use their PMDs 914 to access the EGM casino network connection 918 of the casino or the Internet 908 without using a wireless access point for the Internet connection 908. The players 920 may use the web browser on their device 914 or applications installed on their device 914 that access the networks 918, 908.

As illustrated in FIG. 9, the player 920 is using EGM1 902D which is at a bank of EGMs 902. The player 920 has a PMD 914 that has wireless capabilities (such as 802.11 or Bluetooth) and can connect without a wireless access point. In one embodiment, the player 920 has a player tracking card or player account at the gaming venue. The server/host 904 shown is part of the casino service based system and/or host system. In one embodiment, the PMD 914 may be directly paired with at least one of the EGMs 902 using the pairing connection 916.

It should be noted, as described herein, the activity of the personal mobile device may be monitored by that is in communication with the server/host. In one embodiment, the monitoring operations overlaps with targeted advertising thereby increasing the player's experience (e.g. automatically customizing EGM language or available games based on mobile-to-web activity). In one embodiment, the play may provide authorization for the system/host to monitor the PMD. For example, when the Player accesses the player account a notification and/or a request may be presented on the PMD requesting authorization for the system/host to monitor the PMD. In one embodiment, the play may opt in and grant access to the PMD. In one embodiment, the player may be provided promotional products/events for automatically allowing the system/host to monitor the PMD. In one embodiment, as part of joining a players club the Player may agree to allow for the gaming venue to monitor the PMD as part of receiving the various benefits of the players club and players account. Thus, in one embodiment, the player opts in and agrees for the monitoring of the PMD to obtain, sample, harvest, and/or collect the activity of the PMD in real time when the player agrees to the terms of service of the players account, use of the EGM, and/or for use of the service window application. In one embodiment, the PMD application is always asking to be able to use location services to drive a more relevant and useful experience and customers opt in or not.

In one embodiment, the play may opt in using an IGT® and/or operator mobile application and/or Internet web site. The player may be provided a variety of information relating to what will be done to provide them a better experience before asking them to opt in. For example, the system/host may provide the player a variety of gaming credits and/or some other reward for trying the sampling of the PMD. If the players starts seeing the EGMs react to them in ways the player likes the player may leave the monitoring enabled. In one embodiment, the player is provided way to disable the monitoring either on the PMD and/or EGM if they so choose. Moreover, in one embodiment, the player is notified that the monitoring activity of the player's PMD is not shared with anyone outside the operator, IGT, and/or authorized gaming venue(s).

In one embodiment, the present invention samples the information from the PMD either uses TCP/IP network connection flowing over a cellular network, and/or Wi-Fi as the mobile device manages the physical network used. In one embodiment, the embodiments described herein may be in a cloud service based system and/or may not be in a cloud service but rather instead focuses on mobile device to operator back-of-house systems and/or mobile device to EGM communications. For communications to the operator back-of-house systems it's a TCP/IP network connection flowing over either a cellular network and/or an operator's Wi-Fi network. In one embodiment, the mobile device to EGM communications short range network technologies (NFC, Bluetooth, Bluetooth Low Energy) are used, which may involve TCP/IP. Thus, in one embodiment, the present invention uses a direct mobile device to operator back-of-house system or EGM communication with and/or without a cloud platform service. In one embodiment, uses a direct mobile device to operator back-of-house system or EGM communication without routing everything through a cloud service. A customer wanting to switch to using a different cloud service or to using their own internally developed mobile device platform likely has to start over on developing their mobile apps.

For example, in one embodiment, using the direct network connection with the EGM and the PMD, a player may be standing on the casino floor as a slot tech checking a 401K balance and/or potentially performing some administrative service on the floor, but may perform these functions with a mobile device that directly communicates to the operator back-of-house systems and/or an EGM. For example, in one embodiment, the player may use the mobile device to card in at an EGM and/or potentially share a game win screen on Facebook by having the EGM share a screen capture image with an operator/IGT mobile device app that posts it to Facebook for the player. Thus, the embodiments described herein, allows the screen capture to go directly from the EGM, to the to the PMD and then to Facebook using the direct network communication with the EGM and the PMD.

Figure 10A:
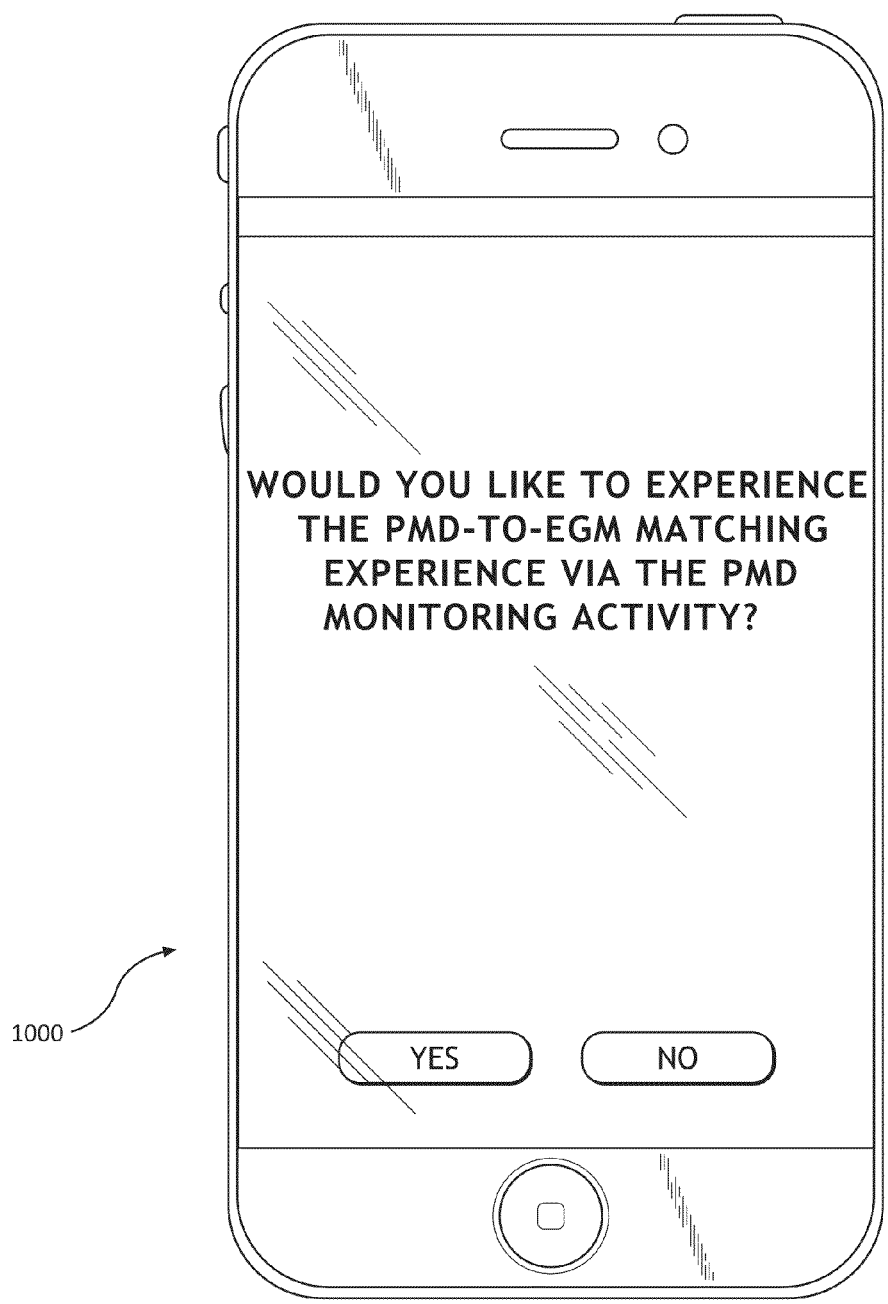
FIG. 10A-C are block diagrams illustrating an exemplary an external application displaying various electronic gaming machines (EGMs) options on a personal mobile device (PMD) based on sampled information from the PMD when the PMD is connected to an EGM in which aspects of the present invention may be realized.
Figure 10B:
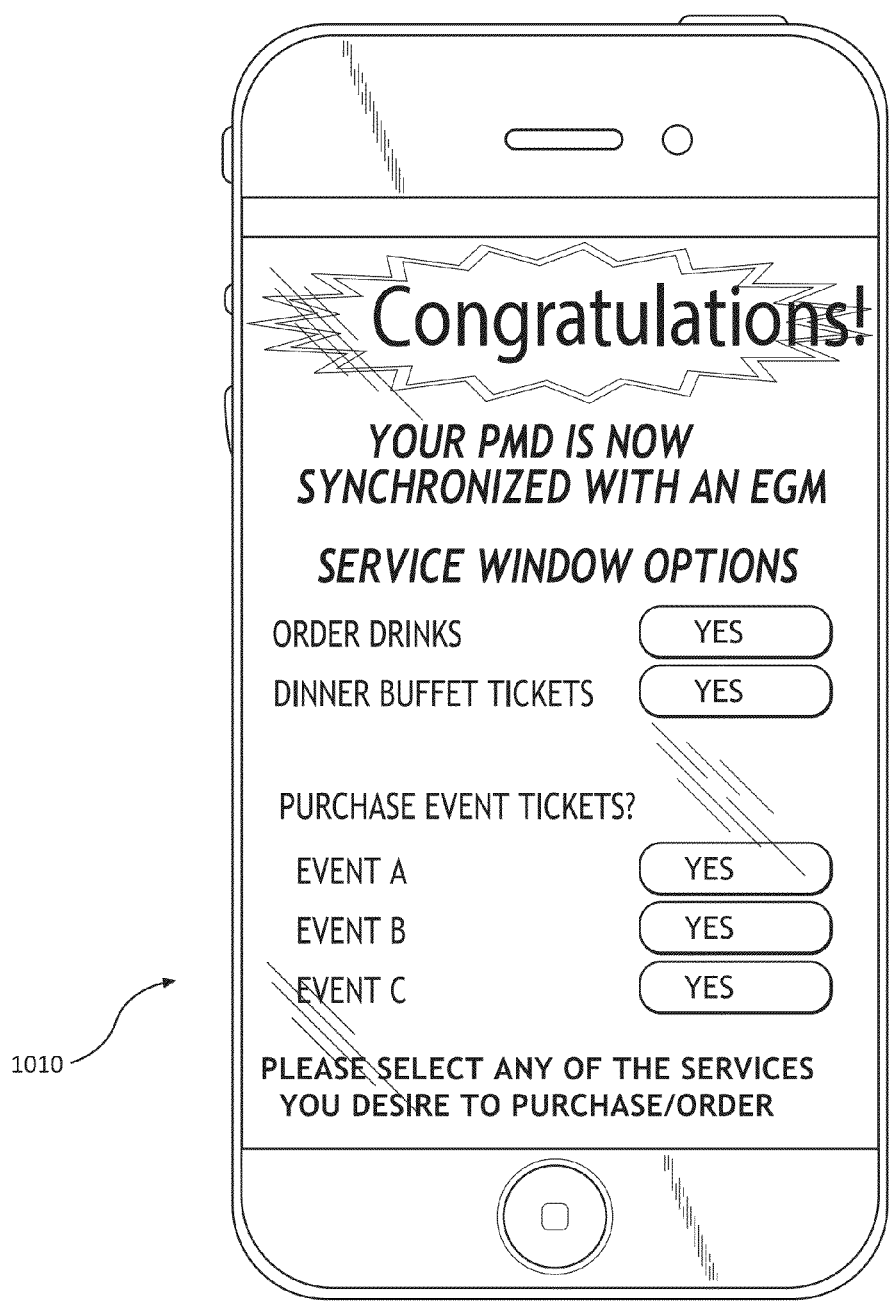
Figure 10C:

FIG. 10A-C are block diagrams illustrating an exemplary an external application displaying various electronic gaming machines (EGMs) options on a personal mobile device (PMD) based on sampled information from the PMD when the PMD is connected to an EGM in which aspects of the present invention may be realized. FIG. 10A-C are each related and are shown as one continuous example of the consecutive window screens on an external application device (e.g., the personal mobile device 'PMD') and/or on an EGM that a player may be shown. It should be noted that the PMD and/or external application located on the PMD and/or EGM is used as an example and an actual EGM may also be used and substituted herein with all the data displayed and used in FIG. 10A-C being displayed and used in a service window application of the EGM itself. In other embodiments, the displayed data may be altered, changed, and customized based on the gaming venue preferences, the PMD and/or the EGM applications and functional capabilities, manufactures specification and technical abilities, and/or gaming commission regulations.

As illustrated in FIG. 10A, the PMD 1000 (e.g., a smart phone, an electronic tablet, a computer, and the like) using a service window application and using a server-based gaming network (e.g., sbX™ network), servers (e.g., sbX™ servers), and/or hosts of the gaming network, for sampling information from the PMD. However, prior to a system/host (e.g., see FIG. 6 604) sampling the information from the PMD, the player is provided a notification by the system/host asking for permission if the player would like to experience the PMD-to-EMG synchronization via the monitoring and sampling of information on the PMD. If a player has not previously provided permission for the monitoring, the player is presented with the options to select "YES" and/or "NO."

As illustrated in FIG. 10B, the PMD 1010 is notified that the PMD is now connected to the EGM, using one of the various embodiments described above, and the PMD is now synchronized with at least one or more EGM's. The service window application of one of the EGM's is now displayed in real time on the PMD. Using the PMD, the player is provided with one or more options available via the service window application of the EMG. For example, the player may choose to order drinks, purchase buffet tickets, purchase event tickets, and the like. For example, the player may be presented with the options and able to select "YES" and/or "NO." In one embodiment, service window may offer various service items, promotions, and/or other gaming and/or non-gaming related activities based on the sampled information of the PMD. In one embodiment, the PMD may include a service window application suitable for a personal mobile device for ease, convenience, and/or simplicity thereby offering identical data on either the EGM and/or PMD. For example, the PMD may display the identical screen as shown on the EGM. In other embodiments, the EGM may also display the identical screen being displayed on the PMD.

As illustrated in FIG. 10C, the PMD 1030 is notified that the PMD 1030 has engaged in various types of activity and the sampled information collected via a system/host of the gaming network detects this activity and a notification is provided to the PMD of the new activity. As such, the player is presented various options for selection based on the sampled information. For example, using the example above, if the player is visiting a favorite sports team (e.g., the Dallas Cowboys®) on the PMD, the EGM game theme may be altered to be football, sports, Texas, and/or specifically the Dallas Cowboys®. In other words, the game and/or gaming theme may be altered and/or synchronized from a voluminous storage of game themes to match data relating to the activity of the PMD. For example, the player may select games and/or gaming themes related to football, Texas Tea slot games, an/or Texas Hold 'em poker.

Figure 11:
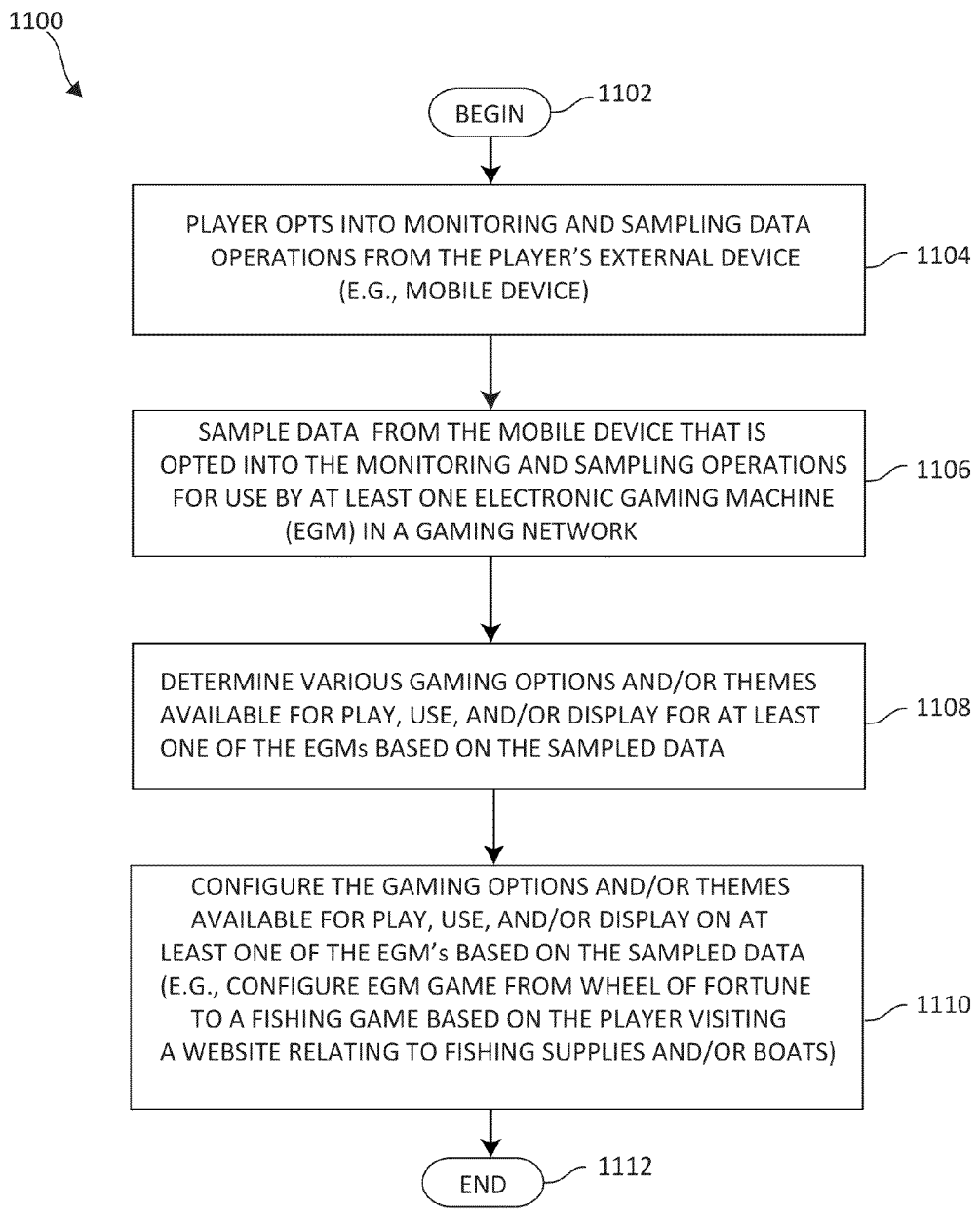
FIG. 11 is a flow chart illustrating an exemplary method for configuring gaming options and/or gaming themes on an electronic gaming machine (EGM) system based on monitoring and/or sampling data from a personal mobile device (PMD) in which aspects of the present invention may be realized.

FIG. 11 is a flow chart illustrating an exemplary method 1100 for configuring gaming options and/or gaming themes on an electronic gaming machine (EGM) system based on monitoring and/or sampling data from a personal mobile device (PMD) in which aspects of the present invention may be realized. The method 1100 begins (step 1102) with a player opting into a monitoring and/or sampling data operations from the player's external device (e.g., a mobile device) (step 1104). The method 1100 samples data from the mobile device (which is approved for the monitoring and/or sampling of data) for use by at least one electronic gaming machine (EGM) in a gaming network (step 1106). The method 1100 determines the various gaming options (e.g., types of games available for play on an EGM) and/or gaming themes available for play, use, and/or display for one of the EGMs based on the sampled data (step 1108). The method 1100 configures the various gaming and/or gaming themes available for play, use, and/or display on one of the EGMs based on the sampled data (e.g., the EGM may be configured from the EGM game "wheel of fortune" to the EGM game "Alaskan Fishing" based on the player visiting a website relating to fishing supplies, boats, and/or other outdoor type activities related to the various gaming options and/or gaming themes) (step 1110). The method 1100 ends (step 1112).

Figure 12:
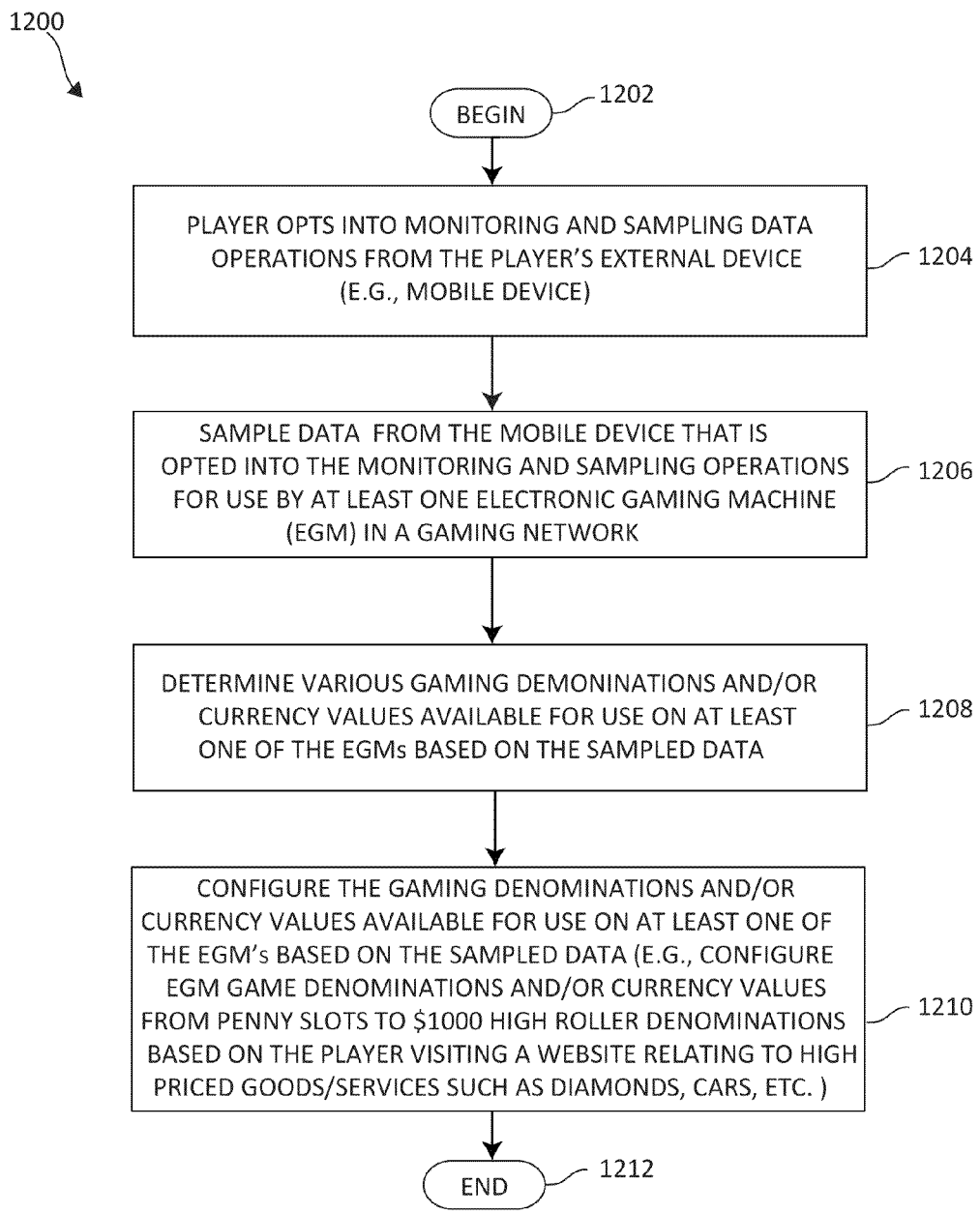
FIG. 12 is a flow chart illustrating an exemplary method for configuring denominations and/or currency values on an electronic gaming machine (EGM) system based on monitoring and/or sampling data from a personal mobile device (PMD) in which aspects of the present invention may be realized in which aspects of the present invention may be realized.

FIG. 12 is a flow chart illustrating an exemplary method 1200 for configuring denominations and/or currency values on an electronic gaming machine (EGM) system based on monitoring and/or sampling data from a personal mobile device (PMD) in which aspects of the present invention may be realized in which aspects of the present invention may be realized. The method 1200 begins (step 1202) with a player opting into a monitoring and/or sampling data operations from the player's external device (e.g., a mobile device) (step 1204). The method 1200 samples data from the mobile device (which is approved for the monitoring and/or sampling of data) for use by at least one electronic gaming machine (EGM) in a gaming network (step 1206). The method 1200 determines the various gaming denominations and/or currency values (e.g., U.S. Dollar, Japanese Yen, and the like such as changing the denomination from penny currency to $1,000 US dollar denomination value) available for play and/or use on one of the EGMs based on the sampled data (step 1208). The method 1200 configures the various gaming denominations and/or currency values available for play, use, and/or display for one of the EGMs based on the sampled data (e.g., the EGM may be configured from the casino game denominations and/or currency values from penny slots, such as 5, 10, 15, and/or 25 cent denominations to $100, $500, and/or $1000 high roller denomination currency values) (step 1210). The method 1200 ends (step 1212).

Figure 13:
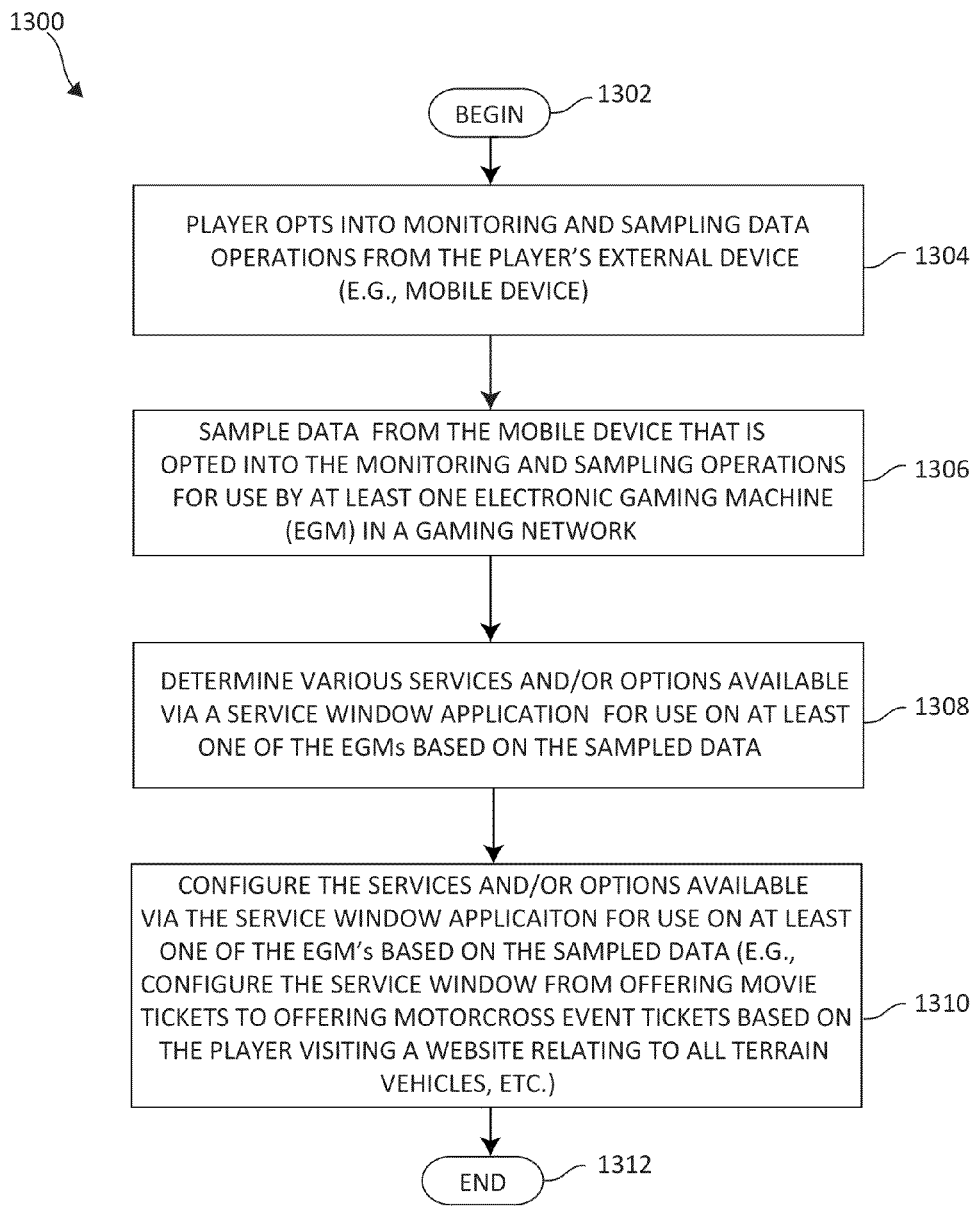
FIG. 13 is a flow chart illustrating an exemplary method configuring a service window on an electronic gaming machine (EGM) system based on monitoring and/or sampling data from a personal mobile device (PMD) in which aspects of the present invention may be realized in which aspects of the present invention may be realized.

FIG. 13 is a flow chart illustrating an exemplary method 1300 configuring a service window on an electronic gaming machine (EGM) system based on monitoring and/or sampling data from a personal mobile device (PMD) in which aspects of the present invention may be realized in which aspects of the present invention may be realized. The method 1300 begins (step 1302) with a player opting into a monitoring and/or sampling data operations form the player's external device (e.g., a mobile device) (step 1304). The method 1300 samples data from the mobile device (which is approved for the monitoring and/or sampling of data) for use by at least one electronic gaming machine (EGM) in a gaming network (step 1306). The method 1300 determines the various services and/or service window options available on a service window via a service window application/system, available for use and/or display on one of the EGMs based on the sampled data (step 1308). The method 1300 configures the various services and/or service window options available on a service window via a service window application/system, available for use and/or display on one of the EGMs based on the sampled data (e.g., the service window displayed and/or used by the EGM is configured from offering movie tickets to offering motor cross event tickets based on the player visiting a website relating to "all terrain vehicles", etc.) (step 1310). The method 1300 ends (step 1312).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for dynamically configuring a gaming device in a gaming system having at least one processor device, the method comprising:

connecting a mobile device to a host server;

virtually connecting the mobile device to the at least one EGM via the host server in the gaming network, the host server is connected to both the mobile device and the at least one EGM, and the host server functions as a proxy for communication between the mobile device and the at least one EGM;

authorizing a host server in a gaming network to monitor and sample data operations on a mobile device, wherein a user opts into monitoring and sampling data operations from the mobile device;

providing, by the host server, at least one of a bonus reward, a gaming credit, and a promotional product or event on the at least one EGM for allowing the host server to monitor and execute sampling data operations on the mobile device;

monitoring and sampling information from the mobile device using the host server that is connected to the gaming network for use by the at least one (EGM) included in the gaming network;

determining and configuring both a plurality of gaming options and themes and a plurality of gaming denominations and currency values that are available for use and display on the at least one EGM according to the sampled information; and determining and configuring a plurality of services and non-gaming applications available on a service window for use and display on the at least one EGM according to the sampled information.

2. The method of claim 1, further including, wherein the sampled information includes at least one of data, behavior characteristics and use patterns of the user of the mobile device, graphical theme of the EGM, gaming activities, internet activity, responses, social media data, stored mobile device data, player account data, and information used by the EGM.

3. The method of claim 1, further including configuring the at least one EGM according to one of a plurality of predetermined preferences, EGM gaming volume, EGM gaming speed, EGM bonus events, multimedia events, historical usage of the mobile device on the at least one of the plurality of EGMs, player account information provided to the gaming network from the mobile device, a plurality of gaming applications available on the at least one of the plurality of EGMs, the plurality of services and non-gaming applications offered by the at least one of the plurality of EGMs.

4. The method of claim 3, wherein the configuring further includes customizing the at least one EGM.

5. The method of claim 4, further including customizing the at least one EGM to match the sampled information from the mobile device.

6. The method of claim 4, further including customizing feast each one of a menu, a plurality of display information, the service window on the at least one EGM, a plurality of pay tables and denominations on the at least one EGM, gaming activity, EGM applications, a style of gaming activity on the at least one EGM to match a gaming style on the mobile device, wherein the plurality of display information includes at least a plurality of languages.

7. The method of claim 6, further including allowing the mobile device to similarly customize an external application on the mobile device based on the configuring and customizing of the EGM.

8. The method of claim 1, further including monitoring the mobile device by the host server of the gaming network for sampling the information from the mobile device in real time.

9. The method of claim 8, further including performing one of:
   detecting the mobile device is actively browsing the gaming network,
   detecting the mobile device is actively browsing one of a non gaming network and a website during a gaming activity,
   notifying the mobile device upon an occurrence of a gaming event during the gaming activity, and
   determining a users interest level for the at least one of the EGM based on the sampled information.

10. The method of claim 1, further including sampling the information on the mobile device upon performing each one of:
   logging into a players account on the gaming network,
   inserting a gaming card associated with the players account in the at least one EGM,
   logging into the players account by entering a plurality of information associated with the players account into the at least one EGM,
   using an external application on the mobile device for accessing the at least one EGM,
   authenticating the mobile device via the host server in the gaming network for using the at least one EGM, and
   accessing the at least one EGM via a service based system on the host server in the gaming network.

11. The method of claim 1, further including using the host server in the gaming network for one of acting as a proxy for communicating between the mobile device and the at least one EGM.

12. The method of claim 1, further including directly pairing the mobile device to the at least one EGM.

13. A system for dynamically configuring a gaming device in a gaming system, the system comprising:
   a gaming network;
   a host server in the gaming network;
   at least one electronic gaming machine (EGM) in the gaming network in communication with the host server;
   at least one master controller in communication with the at least one EGM and the host server; and
   at least one processor device, in communication with the at least one master controller, operable on the at least one EGM, wherein the at least one processor device:
      connects a mobile device to a host server in a gaming network,
      virtually connects the mobile device to the at least one electronic gaming machine (EGM) in the gaming network, the host server connected to both the mobile device and the at least one EGM, and the host server functions as a proxy for communication between the mobile device and the at least one EGM,
      authorizes a host server in a gaming network to monitor and sample data operations on a mobile device, wherein a user opts into monitoring and sampling data operations from the mobile device,
      provides, by the host server, at least one of a bonus reward, a gaming credit, and a promotional product or event on the at least one EGM for allowing the host server to monitor and execute sampling data operations on the mobile device,
      monitors and samples information from the mobile device using the host server that is connected to the gaming network for use by the at least one (EGM) included in the gaming network,
      determines and configures both a plurality of gaming options and themes and a plurality of gaming denominations and currency values that are available for use and display on the at least one EGM according to the sampled information, and
      determines and configures a plurality of services and non-gaming applications available on a service window for use and display on the at least one EGM according to the sampled information.

14. The system of claim 13, wherein the sampled information includes at least one of data, behavior characteristics and use patterns of the user of the mobile device, graphical theme of the EGM, gaming activities, internet activity, responses, social media data, stored mobile device data, player account data, and information used by the EGM.

15. The system of claim 13, wherein the at least one processor device configures the at least one EGM according to one of a plurality of predetermined preferences, EGM gaming volume, EGM gaming speed, EGM bonus events, multimedia events, historical usage of the mobile device on the at least one of the plurality of EGMs, player account information provided to the gaming network from the mobile device, a plurality of gaming applications available on the at least one of the plurality of EGMs, the plurality of services and non-gaming applications offered by the at least one EGM.

16. The system of claim 15, wherein the at least one processor device customizes the at least one EGM.

17. The system of claim 16, wherein the at least one processor device customizes the at least one EGM to match the sampled information from the mobile device.

18. The system of claim 16, wherein the at least one processor device customizes at least one of a menu, a plurality of display information, the service window on the at least one EGM, a plurality of pay tables and denominations on the at least one EGM, gaming activity, EGM applications, a style of gaming activity on the at least one EGM to match a gaming style on the mobile device, wherein the plurality of display information includes at least a plurality of languages.

19. The system of claim 18, wherein the at least one processor device allows the mobile device to similarly customize an external application on the mobile device based on the configuring and customizing of the EGM.

20. The system of claim 13, wherein the at least one processor device monitors the mobile device by the host server of the gaming network for sampling the information from the mobile device in real time.

21. The system of claim 20, wherein the at least one processor device performing one of:
  detecting the mobile device is actively browsing the gaming network,
  detecting the mobile device is actively browsing one of a non gaming network and a website during a gaming activity,
  notifying the mobile device upon an occurrence of a gaming event during the gaming activity, and
  determining a users interest level for the at least one of the EGM based on the sampled information.

22. The system of claim 13, wherein the at least one processor device samples the information on the mobile device upon performing each one of:
  logging into a players account on the gaming network,
  inserting a gaming card associated with the players account in the at least one EGM,
  logging into the players account by entering a plurality of information associated with the players account into the at least one EGM,
  using an external application on the mobile device for accessing the at least one EGM authenticating the mobile device via the host server in the gaming network for using the at least one EGM, and
  accessing the at least one EGM via a service based system on the host server in the gaming network, wherein the service based system is connected to both the mobile device and the at least one EGM.

23. The system of claim 13, wherein the at least one processor device uses the host server in the gaming network for one of acting as a proxy for communicating between the mobile device and the at least one EGM.

24. The system of claim 13, wherein the at least one processor device directly pairs the mobile device to the at least one EGM.

25. A computer program product for dynamically configuring a gaming device in a gaming system with at least one processor device, the computer program product comprising a computer-readable storage medium having computer-readable program code portions stored therein, the computer-readable program code portions comprising:
  a first executable portion that connects a mobile device to a host server in a gaming network;
  a second executable portion that virtually connects the mobile device to the at least one electronic gaming machine (EGM) in the gaming network, the host server connected to both the mobile device and the at least one EGM, and the host server functions as a proxy for communication between the mobile device and the at least one EGM;
  a third executable portion that authorizes a host server in a gaming network to monitor and sample data operations on a mobile device, wherein a user opts into monitoring and sampling data operations from the mobile device;
  a fourth executable portion that provides, by the host server, at least one of a bonus reward, a gaming credit, and a promotional product or event on the at least one EGM for allowing the host server to monitor and execute sampling data operations on the mobile device;
  a fifth executable portion that monitors and samples information from a mobile device that is connected to a gaming network for use by at least one electronic gaming machine (EGM) included in the gaming network;
  a sixth executable portion that determines and configures both a plurality of gaming options and themes and a plurality of gaming denominations and currency values that are available for use and display on the at least one EGM according to the sampled information; and
  a seventh executable portion that determines and configures a plurality of services and non-gaming applications available on a service window for use and display on the at least one EGM according to the sampled information.

26. The computer program product of claim 25, wherein the sampled information includes at least one of data, behavior characteristics and use patterns of the user of the mobile device, graphical theme of the EGM, gaming activities, internet activity, responses, social media data, stored mobile device data, player account data, and information used by the EGM.

27. The computer program product of claim 25, further including an eighth executable portion that configures the at least one EGM according to one of a plurality of predetermined preferences, EGM gaming volume, EGM gaming speed, EGM bonus events, multimedia events, historical usage of the mobile device on the at least one of the plurality of EGMs, player account information provided to the gaming network from the mobile device, a plurality of gaming applications available on the at least one of the plurality of EGMs, a plurality of services and non-gaming applications offered by the at least one of the plurality of EGMs.

28. The computer program product of claim 27, further including a ninth executable portion that customizing the at least one EGM.

29. The computer program product of claim 28, further including a tenth executable portion that customizes the at least one EGM to match the sampled information from the mobile device.

30. The computer program product of claim 28, further including a tenth executable portion that customizes at least each one of a menu, a plurality of display information, a service window on the at least one EGM, a plurality of pay tables and denominations on the at least one EGM, gaming activity, EGM applications, a style of gaming activity on the at least one EGM to match a gaming style on the mobile device, wherein the plurality of display information includes at least a plurality of languages.

31. The computer program product of claim 30, further including an eleventh executable portion that allows the mobile device to similarly customize an external application on the mobile device based on the configuring and customizing of the EGM.

32. The computer program product of claim 25, further including an eighth executable portion that monitors the mobile device by the host server of the gaming network for sampling the information from the mobile device in real time.

33. The computer program product of claim 32, further including a ninth executable portion that performs one of:
   detecting the mobile device is actively browsing the gaming network,
   detecting the mobile device is actively browsing one of a non gaming network and a website during a gaming activity,
   notifying the mobile device upon an occurrence of a gaming event during the gaming activity, and
   determining a users interest level for the at least one of the EGM based on the sampled information.

34. The computer program product of claim 25, further including an eighth executable portion that samples the information on the mobile device upon performing each one of:
   logging into a players account on the gaming network,
   inserting a gaming card associated with the players account in the at least one EGM,
   logging into the players account by entering a plurality of information associated with the players account into the at least one EGM,
   using an external application on the mobile device for accessing the at least one EGM,
   authenticating the mobile device via the host server in the gaming network for using the at least one EGM, and
   accessing the at least one EGM via a service based system in the gaming network, wherein the service based system is connected to both the mobile device and the at least one EGM.

35. The computer program product of claim 25, further including an eighth executable portion that uses the host server in the gaming network for one of acting as a proxy for communicating between the mobile device and the at least one EGM.

36. The computer program product of claim 25, further including an eighth executable portion that directly pairs the mobile device to the at least one EGM.

* * * * *